(12) United States Patent
Fujito

(10) Patent No.: US 8,708,827 B2
(45) Date of Patent: Apr. 29, 2014

(54) NETWORK BREEDING GAME SYSTEM, BREEDING GAME SERVER APPARATUS AND BREEDING GAME TERMINAL APPARATUS, CHARACTER DISPLAY METHOD, TOGETHER WITH PROGRAM AND RECORDING MEDIUM

(75) Inventor: Yoji Fujito, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1663 days.

(21) Appl. No.: 11/755,405

(22) Filed: May 30, 2007

(65) Prior Publication Data

US 2008/0045285 A1  Feb. 21, 2008

(30) Foreign Application Priority Data

Aug. 21, 2006 (JP) .................................. 2006-224153

(51) Int. Cl.
*A63F 9/24* (2006.01)
(52) U.S. Cl.
USPC .................... 463/42; 463/31; 463/40; 463/9
(58) Field of Classification Search
USPC ........................................ 463/31, 40, 42, 7, 9
See application file for complete search history.

(56) References Cited

U.S. PATENT DOCUMENTS

| 5,572,646 A * | 11/1996 | Kawai et al. .................. 345/501 |
| 6,037,952 A | 3/2000 | Kawai et al. |
| 6,043,822 A | 3/2000 | Sato |
| 6,061,071 A | 5/2000 | Kawai et al. |
| 6,118,458 A | 9/2000 | Kawai et al. |
| 6,251,012 B1 * | 6/2001 | Horigami et al. ................. 463/7 |
| 6,633,295 B1 | 10/2003 | Sato |
| 2004/0053690 A1 * | 3/2004 | Fogel et al. ...................... 463/31 |
| 2005/0045025 A1 * | 3/2005 | Wells et al. ...................... 84/615 |
| 2005/0192864 A1 * | 9/2005 | Ganz ............................... 705/14 |
| 2006/0252458 A1 * | 11/2006 | Maschke et al. ........... 455/556.1 |

FOREIGN PATENT DOCUMENTS

JP  2848219  11/1998

OTHER PUBLICATIONS

English language Abstract of JP 7-160853.

* cited by examiner

*Primary Examiner* — Paul A D'Agostino
*Assistant Examiner* — Brandon Gray
(74) *Attorney, Agent, or Firm* — Greenblum & Bernstein, P.L.C.

(57) ABSTRACT

In a network game system, as well as causing a player to appreciate a growth of a character in accordance with an elapsing of time, to cause the player not to feel a strangeness either in a display of a character which another player is breeding. A visible range of a hypothetical space displayed on a display device for each player participating in a network game is managed. Also, a plurality of parameters, including a number of breeding days, strength, stamina and judgment, are set in a breeding character which each player breeds, and managed in a server apparatus. Although the number of breeding days is updated at a daily prescribed time, the strength, the stamina and the judgment are updated in accordance with details of breeding which each player has carried out for the breeding character. Information relating to a breeding character included in the visible range of each player, regardless of whether the relevant player breeds it or another player breeds it, is included in visible range information transmitted from the server apparatus.

20 Claims, 11 Drawing Sheets

| 601 | 602 | 603 | 604 |
|---|---|---|---|
| BREEDING PLAN NUMBER | NUMBER OF BREEDING DAYS LOGGING OUT TIME | FIRST DAY TRAINING PLAN | FIRST DAY TRAINING DETAILS |
| | | SECOND DAY TRAINING PLAN | SECOND DAY TRAINING DETAILS |
| | | ⋮ | ⋮ |
| | | Mth DAY TRAINING PLAN | Mth DAY TRAINING DETAILS |

600

EGG (ZERO DAYS)

CHICK (ONE TO FIVE DAYS)

YOUNG BIRDS (SIX TO FIFTEEN DAYS)

GROWN BIRDS (SIXTEEN TO SIXTY DAYS)

FIG. 6

| P-ID | PW | HN | PC ASPECT | PC POSITION | PC ORIENTATION | FINAL LOGGING OUT DATE AND TIME | LATEST LOGGING IN DATE AND TIME | EVENT IN PROGRESS FLAG |
|---|---|---|---|---|---|---|---|---|
| 401 | 402 | 403 | 404 | 405 | 406 | 407 | 408 | 409 |
|  |  |  |  |  |  |  |  |  |
| ----- | ----- | ----- | ----- | ----- | ----- | ----- | ----- | ----- |
|  |  |  |  |  |  |  |  |  |

| 501 | 502 | 503 | 504 | 505 | 506 | 507 | 508 | 509 | 510 | 511 | 512 | 513 | 514 |
|---|---|---|---|---|---|---|---|---|---|---|---|---|---|
| BC-ID | P-ID | BREEDING START DATE AND TIME | BC COLOR | NUMBER OF BREEDING DAYS (EXTENT OF GROWTH) | STRENGTH (THICKNESS OF LEGS) | STAMINA (SIZE OF TAIL FEATHERS) | JUDGMENT (LENGTH) (OF BEAK) | HP | STOMACH CONDITION | AFFECTION | BC POSITION | BC ORIENTATION | BREEDING PLAN |
|  |  |  |  |  |  |  |  |  |  |  |  |  |  |
| ----- | ----- | ----- | ----- | ----- | ----- | ----- | ----- | ----- | ----- | ----- | ----- | ----- | ----- |
|  |  |  |  |  |  |  |  |  |  |  |  |  |  |

| 601 | 602 | 603 | 604 |
|---|---|---|---|
| BREEDING PLAN NUMBER | NUMBER OF BREEDING DAYS LOGGING OUT TIME | FIRST DAY TRAINING PLAN | FIRST DAY TRAINING DETAILS |
| | | SECOND DAY TRAINING PLAN | SECOND DAY TRAINING DETAILS |
| | | --- | --- |
| | | Mth DAY TRAINING PLAN | Mth DAY TRAINING DETAILS |

600

NETWORK BREEDING GAME SYSTEM, BREEDING GAME SERVER APPARATUS AND BREEDING GAME TERMINAL APPARATUS, CHARACTER DISPLAY METHOD, TOGETHER WITH PROGRAM AND RECORDING MEDIUM

CROSS REFERENCE TO RELATED APPLICATION

The present disclosure relates to subject matter contained in Japanese Patent Application No. 2006-224153, filed on Aug. 21, 2006, the disclosure of which is expressly incorporated herein by reference in its entirety.

BACKGROUND OF THE INVENTION

1. Technical Field

The present invention relates to a network breeding game, in which a player breeds a character in a system configured of a server apparatus, and a terminal apparatus connected to and disconnected from the relevant server apparatus via a network.

2. Related Art

A breeding game in which a character bred as a hypothetical pet (hereafter, a breeding character) is bred, being a game which can be played regardless of an age of a player, is widely known as one field of computer games. In the breeding game, in order that the player can give care at an optional timing, and breed the breeding character meticulously, it is often the case that a portable type game machine, game dedicated or used in conjunction with another application, is used as a platform to execute this (for example, refer to Japanese Patent No. 2,848, 219).

In a first appearing breeding game, regardless of whether the portable type game machine has been made the platform, or a pre-installed type game machine has been made the platform, the breeding character has been bred in a hypothetical space enclosed within the relevant game machine. For this reason, even in a case of players playing the same breeding game, it has been difficult for interaction between the players to arise.

With respect to this, in recent years, the breeding game has come to be executed on a network in which a plurality of players implement the game in an identical game space. In the case in which the breeding game is executed in a network game, although it is possible for the players to breed their respective breeding characters while interacting, it is a problem for each player to be able to breed a breeding character in such a way as to make it different from the breeding characters of the other players.

However, in a large number of network games, in order to prevent a participation of an illicit player, when a player participating in a game logs in, that is, when a terminal apparatus of the relevant player is connected to a server apparatus, a user authentication is carried out on the player. Consequently, as a troublesome procedure such as the user authentication is necessary when the player actually plays in the game (even in the event that the user authentication is not necessary, a connection procedure itself is troublesome), even in a case of a player who is registered as a participant, a time for which he or she continues a condition of not playing the game inevitably becomes long.

In a case in which the breeding game has been applied in the network game to date, there having been a tendency for the time for which the condition of the player not playing the game continues to become long, as breeding has not been carried out by the player during this time, it goes without saying that the breeding character has not grown. For this reason, the breeding character not having grown at all, despite time having also elapsed while not playing the network game, has given the player a feeling of unnaturalness. In particular, in a case in which the player can also see a breeding character which another player is breeding in the game, a fact that while he or she is playing frequently and causing his or her character to grow, the breeding character of the other player has not grown at all, has been extremely unnatural.

With respect to this, it is also possible, even while the player is not playing the network game, to cause the breeding character to grow in accordance with a time elapsing from a start of its breeding. However, in this kind of case, it being difficult for the player to appreciate that he or she is breeding the breeding character in the game, it has been difficult to maintain an interest of the player in breeding the breeding character.

SUMMARY OF THE INVENTION

The invention has an object of providing a network breeding game system and the like which, in the network game in which the player breeds the character, as well as causing the player to appreciate the growth of the character in accordance with an elapsing of time, do not cause the player to feel a strangeness either in a display of the character which the other player is breeding.

In order to achieve the heretofore described object, a network breeding game system according to a first aspect of the invention is a network breeding game system including: a server apparatus; and a plurality of terminal apparatuses, each of which may be connected to or disconnected from the relevant server apparatus via a network, each player using an individual terminal apparatus to bread a character. The server apparatus includes: a character information storage unit which stores, for every character of each player, major portion parameters indicating an appearance configuration of major portions of the relevant character, non-major portion parameters other than the relevant major portion parameters, and a position in which each character exists in a game space; a visible range information storage unit which stores, for every player of a terminal apparatus which is in a connected condition, visible range information which can specify a range of the game space which can become visible in accordance with the relevant player implementing the game; a breeding time measurement unit which measures a time elapsing from a start of breeding of each character; a major portion parameter update unit which updates the major portion parameters in accordance with only the time elapsing from the start of breeding of the character of each player measured by the breeding time measurement unit; a breeding information reception unit which receives breeding information indicating details of breeding carried out in accordance with an instruction given by an operation of the player in the individual terminal apparatus; a non-major portion parameter update unit which updates, for the character indicated by the breeding information received by the breeding information reception unit, the non-major portion parameters in accordance with the relevant breeding information; and a visible object information transmission unit which transmits visible object information, including the position and major portion parameters stored in the character information storage unit for all characters included in the range of the game space specified by the visible range information stored in the visible range information storage unit, to each of the plurality of terminal apparatuses, regardless of whether they are the characters of the relevant player. Each terminal apparatus includes: a character breeding unit which carries out the breeding of the character in accordance with an instruction given by an operation of the player using the relevant terminal apparatus; a breeding information transmission unit which transmits the breeding information according to the details of the breeding of the character carried out by the character breeding unit to the server apparatus; a visible object information reception unit which receives the visible object information transmitted from the visible object information transmission unit; and a character display unit which displays, on a display device, a character of which the appearance configuration of the major portions corresponds to the major portion parameters included in the relevant visible object information, regardless of whether it is the character of the relevant player, in accordance with the position of the character included in the visible object information received by the visible object information reception unit.

In the heretofore described network breeding game system, the server apparatus, as well as managing the major portion parameters and the non-major portion parameters of each character, manages the position of each character in the game space, and the range of the game space which can be visible to each player. Herein, although the non-major portion parameters are updated depending on the details of the breeding carried out in accordance with the instruction of the player, the major portion parameters, which indicate the appearance configuration of the major portions of each character, are updated depending on the time elapsing from the start of breeding of each character.

Herein, as the server apparatus transmits the information relating to the characters included in the range visible to each player, regardless of whether or not they are those of the relevant player, not only the character which the player is breeding, but also the characters which the other players are breeding, are displayed on the display device of the terminal apparatus of each player. By this means, each player can recognize the appearance of his or her character's growth, in accordance with the time elapsing from the start of breeding, by comparing with an extent of growth of the characters of the other players.

In this case, as the major portion parameters of each character are updated in accordance with only the time elapsing from the start of breeding, regardless of the details of the breeding, even though the breeding information of the other players is transmitted, and the parameters of the characters of the other players are updated, the player does not see a change in the appearance configuration of the major portions displayed on the display device for the characters of the relevant other players before and after that. By this means, each player ultimately does not feel much strangeness in the display of the characters which the other players are breeding.

Meanwhile, as the non-major portion parameters of each character are updated depending on the details of the breeding carried out in accordance with the instruction of each player, each player can appreciate a fact that he or she is breeding the character in the game him or herself. By this means, it ultimately does not happen that the player is caused to lose the interest in breeding the breeding character.

The appearance configuration of the major portions of the character, in the event that a size of the character changes from a size at a time of the start of breeding, includes a size of a whole of the relevant character. In the event that a color of the character changes from a color at the time of the start of breeding, it includes the color of the relevant character. Naturally, it is also acceptable that one of the size or the color of the character does not change, regardless of values of the major portion parameters and the non-major portion parameters. Also, as long as the non-major portion parameters are at least updated depending on the details of the breeding carried out in accordance with the instruction of each player, it is also acceptable that they are further updated in accordance with the time elapsing from the start of breeding.

In the heretofore described network breeding game system, it is acceptable that the character information storage unit stores ancillary portion parameters indicating an appearance configuration of ancillary portions of the relevant character as the non-major portion parameters. In this case, the visible object information transmission unit can transmit visible object information which further includes the ancillary portion parameters stored in the character information storage unit for all the characters included in the range of the game space specified by the visible range information, and the character display unit can display a character of which the appearance configuration of the ancillary portions corresponds to the ancillary portion parameters of the character included in the visible object information received by the visible object information reception unit.

In this case, although the appearance configuration of the major portions does not change depending on the details of the breeding, the appearance configuration of the ancillary portions changes depending on the details of the breeding. The player generally pays attention to even a detailed aspect of his or her character. For this reason, the player can recognize that the breeding details which he or she has carried out have been reflected in the parameters of the character from a difference in characteristics of the appearance configuration thereof. Contrarily, as the player does not generally pay as much attention to the characters of the other players as to his or her character, in the event that there is no difference in the appearance configuration of the major aspects, the player is not particularly concerned about a detailed difference in the appearance configuration of the ancillary portions, and does not feel much sense of strangeness in the display.

It is also acceptable that the appearance configuration of the ancillary portions of the character, as well as the ancillary portion parameters, partially depends also on the major portion parameters. For example, in a case in which the major portion parameters indicate the size of the character in four stages of one to four, and the ancillary portion parameter indicates a thickness of legs of the character in two stages of one or two, in the event that the major portion parameters differ as one, two, three and four, even though the ancillary portion parameters are the same two, it is acceptable that the thickness of the legs of the character differs. Meanwhile, when the major portion parameters are one, although the thickness of the legs only differs in accordance with the ancillary parameter, the size of the character as a whole is the same.

In the heretofore described network breeding game system, it can be arranged that the character breeding unit, when a connection between the terminal apparatus and the server apparatus is severed, carries out the breeding of the character in accordance with an instruction given by an operation of the player.

Herein, as each player can carry out the breeding of the character in the terminal apparatus even in a condition in which it is not connected to the server apparatus, the player can readily implement the game (in this case, carry out the breeding of the character) without going through troublesome procedures, such as the user authentication. In this case, it is sufficient that the details of the breeding carried out in the severed condition are stored, and transmitted to the server apparatus from the terminal apparatus corresponding to the stored details of the breeding when it is next connected to the server apparatus.

In the heretofore described network breeding game system, it is also possible to arrange that the character breeding unit, when the terminal apparatus is connected to the server apparatus, carries out the breeding of the character in accordance with the instruction given by the operation of the player.

In this case, as it is necessary for the player to connect the terminal apparatus to the server apparatus even to just carry out the breeding of the breeding character, it is possible to heighten a desire of the player to try to participate in the network game. Also, in the event that the character is bred in the terminal apparatus only in the condition in which it is connected to the server apparatus, as it is possible to centrally manage not only the major portion parameters but also the non-major portion parameters of each character in the server apparatus, it is possible to prevent the parameters of the character from being illicitly updated.

It is also acceptable that the character breeding unit can carry out the breeding of the character both when the terminal apparatus is connected to the server apparatus, and when the connection with the server apparatus is severed. In this case, it is also acceptable that there is a difference in the details of the breeding which can be carried out for the character depending on whether or not the terminal apparatus is connected to the server apparatus.

In the heretofore described network breeding game system, it being acceptable that each terminal apparatus includes: a breeding plan selection unit which, when connected to the server apparatus, selects a breeding plan of the character in accordance with an instruction given by an operation of the player; and a breeding plan transmission unit which transmits the breeding plan selected by the breeding plan selection unit, it is possible to arrange in such a way that the character breeding unit carries out the breeding of the character in accordance with an instruction given by an operation of the player based on the breeding plan selected by the breeding plan selection unit. In this case, it is possible to arrange in such a way that the server apparatus further includes a breeding plan reception unit which receives the breeding plan transmitted from the breeding plan transmission unit, and that the non-major portion parameter update unit updates the non-major portion parameters stored in the character information storage unit for the character corresponding to the relevant breeding information, in accordance with the breeding plan received by the breeding plan reception unit and the breeding information received by the breeding information reception unit.

Herein, each player breeds his or her character in accordance with the breeding plan selected in advance by him or herself. Then, the non-major portion parameters are updated in accordance with not only the details of the breeding which the player has actually carried out, but also the breeding plan selected in advance. By selecting the breeding plan first in this way, it is possible to heighten a desire of the player to try to carry out the breeding of the character. In particular, as it is the breeding plan which the player him or herself has selected, it is possible to further heighten the desire.

In the heretofore described network breeding game system, it being acceptable that the server apparatus further includes: a breeding plan selection unit which selects a breeding plan for each player to carry out the breeding of the character in each player's terminal apparatus; and a breeding plan transmission unit which transmits the breeding plan selected by the breeding plan selection unit to the terminal apparatus of the relevant player, it is acceptable that each terminal apparatus further includes a breeding plan reception unit which receives the breeding plan transmitted from the breeding plan transmission unit. In this case, it is possible to arrange in such a way that the character breeding unit carries out the breeding of the character in accordance with an instruction given by an operation of the player based on the breeding plan received by the breeding plan reception unit, and that the non-major portion parameter update unit updates the non-major portion parameters stored in the character information storage unit for the character corresponding to the relevant breeding information, in accordance with the breeding plan selected by the breeding plan selection unit and the breeding information received by the breeding information reception unit.

Herein, each player breeds a character in accordance with the breeding plan selected in advance in the server apparatus. Then, the non-major portion parameters are updated in accordance with not only the details of the breeding which the player has actually carried out, but also the breeding plan selected in advance. By designating the breeding plan first in this way, it is possible to heighten a desire of the player to try to carry out the breeding of the character. Also, as the breeding plan is selected in the server apparatus without recourse to a free will of the player, it is possible to prevent the details of the breeding carried out for each character from becoming lopsided.

In the case in which the breeding of the character is carried out based on the breeding plan, as heretofore described, it is possible to arrange in such a way that the non-major portion parameter update unit, including a breeding success determination unit which determines, based on the breeding plan selected as the breeding plan of the character and the breeding information received by the breeding information reception unit, whether or not the breeding of the character according to the relevant breeding plan has succeeded, updates the non-major portion parameters stored in the character information storage unit in accordance with a determination result of the relevant breeding success determination unit.

The breeding of the character according to the breeding plan sometimes being a success and sometimes a failure in this way, as the update of the parameters differs depending on whether the breeding has succeeded, it is possible to heighten the interest of the player in the breeding of the character.

Herein, it is acceptable that the character breeding unit includes a non-plan breeding unit, which carries out breeding for the character unconnected with the breeding plan, and a plan breeding unit which carries out breeding for the character in accordance with the breeding plan, and that the non-major portion parameters include at least non-plan parameters, which are updated in accordance with breeding information corresponding to the breeding carried out unconnected with the breeding plan, and plan parameters which are updated in accordance only with breeding information corresponding to the breeding carried out in accordance with the breeding plan. In this case, the breeding plan success determination unit, based furthermore on the non-plan parameters, can determine whether the breeding of the character according to the relevant breeding plan has succeeded.

In this case, as it is possible to carry out breeding for the character with details which do not comply with the breeding plan selected by him or herself, or selected in the server apparatus, it is possible to further heighten the desire of the player to try to carry out the breeding of the character. Moreover, as whether the breeding of the character according to the breeding plan has succeeded is determined based on the non-plan parameters updated in accordance with the details of the breeding carried out unconnected to the breeding plan, it is possible to heighten the desire of the player to try to carry out the breeding outside the breeding plan for the character too.

Also, in the case in which the breeding of the character is carried out based on the training plan, as heretofore described, it being acceptable that the server apparatus further includes a breeding information storage unit which stores the breeding information received by the breeding information reception unit along with the breeding plan corresponding to the relevant breeding information, it can be arranged in such a way that the parameter update unit, when a prescribed event has occurred during an implementation of a game, updates the parameters of the character in accordance with the breeding plan and breeding information stored in the breeding information storage unit.

In this case, as the details of the breeding which the player has carried out are first reflected in the parameters of the character by a prescribed event occurring in the implementation of the game, it is easy for the player to recognize that the details of the breeding are unmistakably being reflected in the parameters of the character.

In the heretofore described network breeding game system, it is possible to arrange in such a way that the server apparatus further includes a character competition unit which causes the characters of the players of the plurality of terminal apparatuses in the connected condition to compete in accordance with the non-major portion parameters stored in the parameter storage unit of the server.

In this case, as the player can cause the character which he or she has bred to compete with characters which other people have bred, it is possible to further heighten the interest of the player in the breeding of the character.

In order to achieve the heretofore described object, a breeding game server apparatus according to a second aspect of the invention is a breeding game server apparatus which may be connected to or disconnected from at least one of a plurality of terminal apparatuses via a network, in which each player using an individual terminal apparatus breeds a character. The apparatus includes: a character information storage unit which stores, for every character of each player, major portion parameters indicating an appearance configuration of major portions of the relevant character, non-major portion parameters other than the relevant major portion parameters, and a position in which each character exists in a game space; a visible range information storage unit which stores, for every player of a terminal apparatus which is in a connected condition, visible range information which can specify a range of the game space which can become visible in accordance with the relevant player implementing the game; a breeding time measurement unit which measures a time elapsing from a start of breeding of each character; a major portion parameter update unit which updates the major portion parameters in accordance only with the time elapsing from the start of breeding of the character of each player measured by the breeding time measurement unit; a breeding information reception unit which receives breeding information indicating details of breeding carried out in accordance with an instruction given by an operation of the player in the individual terminal apparatus; a non-major portion parameter update unit which updates, for the character indicated by the breeding information received by the breeding information reception unit, the non-major portion parameters in accordance with the relevant breeding information; and a visible object information transmission unit which transmits visible object information, including the position and major portion parameters stored in the character information storage unit for all characters included in the range of the game space specified by the visible range information stored in the visible range information storage unit, to each of the terminal apparatuses in the connected condition, regardless of whether or not they are the characters of the relevant player.

In order to achieve the heretofore described object, a breeding game terminal apparatus according to a third aspect of the invention is a breeding game terminal apparatus connected to and disconnected from, via a network, a server apparatus which, as well as managing, for every character of a plurality of players, including characters of other players, major portion parameters indicating an appearance configuration of major portions of the relevant character, non-major portion parameters other than the relevant major portion parameters, and a position in which each character exists in a game space, manages visible range information which can specify a range of the game space which can become visible in accordance with a player implementing the game, in which the player breeds a character. The apparatus includes: a character breeding unit which carries out the breeding of the character in accordance with an instruction given by an operation of the player; a breeding information transmission unit which transmits breeding information according to details of the breeding of the character carried out by the character breeding unit to the server apparatus; a visible object information reception unit which receives visible object information, including the position and major portion parameters of each character for all characters included in the range of the game space specified by the visible range information managed in the server apparatus, regardless of whether or not they are the characters of the relevant player, from the server apparatus; and a character display unit which displays, on a display device, a character of which the appearance configuration of the major portions corresponds to the major portion parameters included in the relevant visible object information, regardless of whether or not it is the character of the relevant player, in accordance with the position of the character included in the visible object information received by the visible object information reception unit.

In order to achieve the heretofore described object, a character display method according to a fourth aspect of the invention is a character display method executed in a server apparatus connected to and disconnected from a plurality of terminal apparatuses via a network, as well as each player using an individual terminal apparatus breeding a character, displaying a character bred by each player on a display device included in each terminal apparatus. The method includes: in the server apparatus, storing, for every character of each player, major portion parameters indicating an appearance configuration of major portions of the relevant character, non-major portion parameters other than the relevant major portion parameters, and a position in which each character exists in a game space, in a storage unit included in the relevant server apparatus, and managing it; in the server apparatus, storing, for every player of a terminal apparatus which is in a connected condition with the relevant server apparatus, visible range information which can specify a range of the game space which can become visible in accordance with the relevant player implementing the game, in the storage unit and managing it; in the server apparatus, measuring a time elapsing from a start of breeding of each character with a time measurement unit included in the server apparatus; in the server apparatus, updating the major portion parameters stored in the storage unit and managed, in accordance only with the time elapsing from the start of breeding of the character of each player; in each terminal apparatus, carrying out the breeding of the character in accordance with an instruction given by an operation of the player of an operation unit included in the relevant terminal apparatus; transmitting breeding information, indicating details of breeding carried out in accordance with the instruction given by the operation of the player in each terminal apparatus, from a terminal side communication unit included in each terminal apparatus, and causing it to be received by a communication unit of the server included in the server apparatus; in the server apparatus, updating the non-major portion parameters, stored in the storage unit in accordance with the relevant breeding information and managed, for the character indicated by the received breeding information; transmitting visible object information, including the position and major portion parameters, stored in the storage unit and managed, for all characters included in the range of the game space specified by the visible range information stored in the storage unit and managed, to each terminal apparatus in the connected condition, regardless of whether or not they are the characters of the relevant player, from the communication unit of the server, and causing it to be received by the terminal side communication unit; and displaying, on the display device, a character of which the appearance configuration of the major portions corresponds to the major portion parameters included in the relevant visible object information, regardless of whether or not it is the character of the relevant player, in accordance with the position of the character included in the visible object information, in the terminal apparatus which has received the visible object information.

In order to achieve the heretofore described object, a program according to a fifth aspect of the invention is a program executed in a computer device connected to and disconnected from a plurality of terminal apparatuses via a network, for each player using an individual terminal apparatus to breed a character. The program causes the computer device to function as: a character information management unit which stores and manages, for every character of each player, major portion parameters indicating an appearance configuration of major portions of the relevant character, non-major portion parameters other than the relevant major portion parameters, and a position in which each character exists in a game space, in a storage unit included in the computer device, and manages them; a visible range information management unit which stores and maneges, for every player of a terminal apparatus which is in a connected condition, visible range information which can specify a range of the game space which can become visible in accordance with the relevant player implementing the game, in a storage unit included in the computer device, and manages it; a breeding time measurement unit which measures a time elapsing from a start of breeding of each character; a major portion parameter update unit which updates the major portion parameters in accordance only with the time elapsing from the start of breeding of the character of each player measured by the breeding time measurement unit; a breeding information reception unit which receives breeding information indicating details of breeding carried out in accordance with an instruction given by an operation of the player in the individual terminal apparatus; a non-major portion parameter update unit which updates, for the character indicated by the breeding information received by the breeding information reception unit, the non-major portion parameters in accordance with the relevant breeding information; and a visible object information transmission unit which transmits visible object information, including the position and major portion parameters managed by the character information management unit for all characters included in the range of the game space specified by the visible range information managed by the visible range information management unit, to each terminal apparatus in the connected condition, regardless of whether or not they are the characters of the relevant player.

In order to achieve the heretofore described object, a program according to a sixth aspect of the invention is a program executed in a computer device connected to and disconnected from, via a network, a server apparatus which, as well as managing, for every character of a plurality of players, including characters of other players, major portion parameters indicating an appearance configuration of major portions of the relevant character, non-major portion parameters other than the relevant major portion parameters, and a position in which each character exists in a game space, manages visible range information which can specify a range of the game space which can become visible in accordance with a player implementing the game, in which the player breeds his or her character. The program causes the computer device to function as: a character breeding unit which carries out the breeding of the character in accordance with an instruction given by an operation of the player; a breeding information transmission unit which transmits breeding information according to details of the breeding of the character carried out by the character breeding unit to the server apparatus; a visible object information reception unit which receives visible object information, including the position and major portion parameters of each character for all characters included in the range of the game space specified by the visible range information managed in the server apparatus, regardless of whether they are the characters of the relevant player, from the server apparatus; and a character display unit which displays, on the display device, a character of which the appearance configuration of the major portions corresponds to the major portion parameters included in the relevant visible object information, regardless of whether it is the character of the relevant player, in accordance with the position of the character included in the visible object information received by the visible object information reception unit.

In order to achieve the heretofore described object, a computer readable recording medium according to a seventh aspect of the invention is a recording medium which has recorded a program executed in a computer device connected to or disconnected from, via a network, a server apparatus which, as well as managing, for every character of a plurality of players, including characters of other players, major portion parameters indicating an appearance configuration of major portions of the relevant character, non-major portion parameters other than the relevant major portion parameters, and a position in which each character exists in a game space, manages visible range information which can specify a range of the game space which can become visible in accordance with a player implementing the game, in which the player breeds his or her character. The program causes the computer device to function as: a character breeding unit which carries out the breeding of the character in accordance with an instruction given by an operation of the player; a breeding information transmission unit which transmits breeding information according to details of the breeding of the character carried out by the character breeding unit to the server apparatus; a visible object information reception unit which receives visible object information, including the position and major portion parameters of each character for all characters included in the range of the game space specified by the visible range information managed in the server apparatus, regardless of whether or not they are the characters of the relevant player, from the server apparatus; and a character display unit which displays, on a display device, a character of which the appearance configuration of the major portions corresponds to the major portion parameters included in the relevant visible object information, regardless of whether or not it is the character of the relevant player, in accordance with the position of the character included in the visible object information received by the visible object information reception unit.

BRIEF DESCRIPTION OF THE DRAWINGS

FIG. 5A shows a game space of a game provided by the network game system according to the embodiment of the invention, while

FIG. 6 shows a player table provided inside a game server apparatus of FIG. 3;

FIG. 7 shows a breeding character table provided inside the game server apparatus of FIG. 3;

FIG. 8 shows a breeding information table provided inside a game server apparatus of FIG. 2;

DESCRIPTION OF THE PREFERRED EMBODIMENT(S)

Hereafter, a description will be given of an embodiment of the invention, with reference to the attached drawings.

Figure 1:
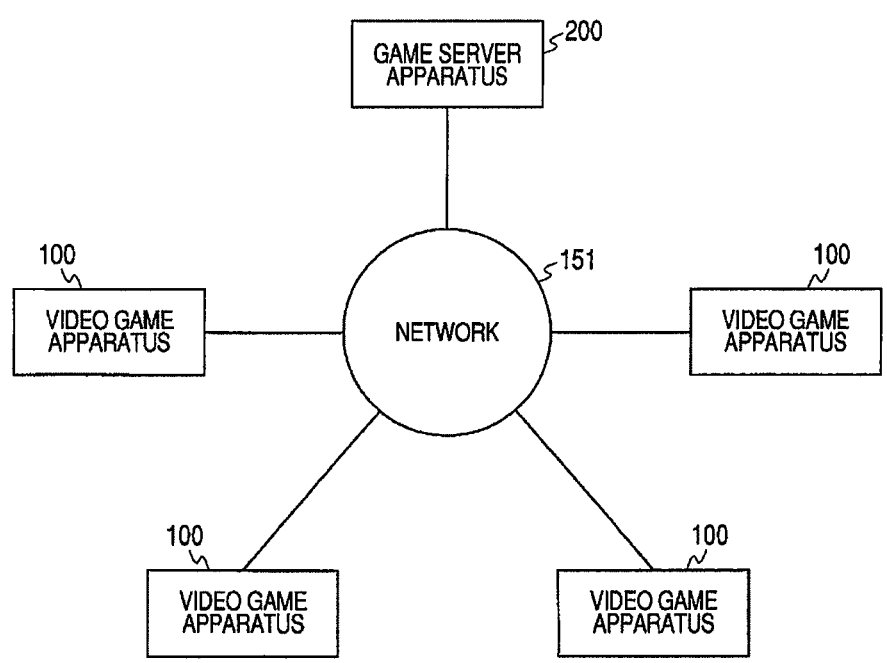
FIG. 1 is a block diagram showing a configuration of a network game system according to an embodiment of the invention.

FIG. 1 is a block diagram showing a configuration of a network game system according to the embodiment. As shown in the figure, the network game system is configured of a plurality (in this case, only four are shown) of video game apparatuses 100, and a game server apparatus 200. Each video game apparatus 100 is connected to the game server apparatus 200 via a network 151.

In a game applied in the network game system, each player who uses the video game apparatus 100 implements the game by moving an own player character on a field formed in a hypothetical three-dimensional space (a game space) common to all the players. Each player can breed a breeding character which exists separately to the player character, and cause the relevant breeding character to compete in a race with breeding characters of other players.

A breeding of the breeding character can be carried out in accordance with a breeding plan selected based on a number of days elapsing from a final logging out to a latest logging in. The breeding plan is such that, when the player character speaks to the breeding character in accordance with an operation of the player, in the event that breeding details carried out based on the breeding plan thus far are not reflected in parameters of the breeding character, the breeding details are reflected in the parameters of the breeding character at that point. In the event that the breeding plan based on the number of days elapsing from the final logging out to the latest logging in has not been selected when the player character speaks to the breeding character (since reflecting the breeding details before the final logging out in the parameters), the breeding plan is selected at that point. The selection of the breeding plan, and an execution of the breeding of the breeding character, will be described in detail hereafter.

In the embodiment, an online condition refers to a period from the player using the video game apparatus 100 being authenticated by means of a logging in process until the player using the video game apparatus 100 withdraws from the game by means of a logging out process. In a period other than this, even though some information is transmitted and received between the video game apparatus 100 and the game server apparatus 200, it is taken to be in an offline condition. Also, in the embodiment, in order to simplify the description, it is taken that a communication between the video game apparatus 100 and the game server apparatus 200 is not cut off without going through the logging out process.

Figure 2:
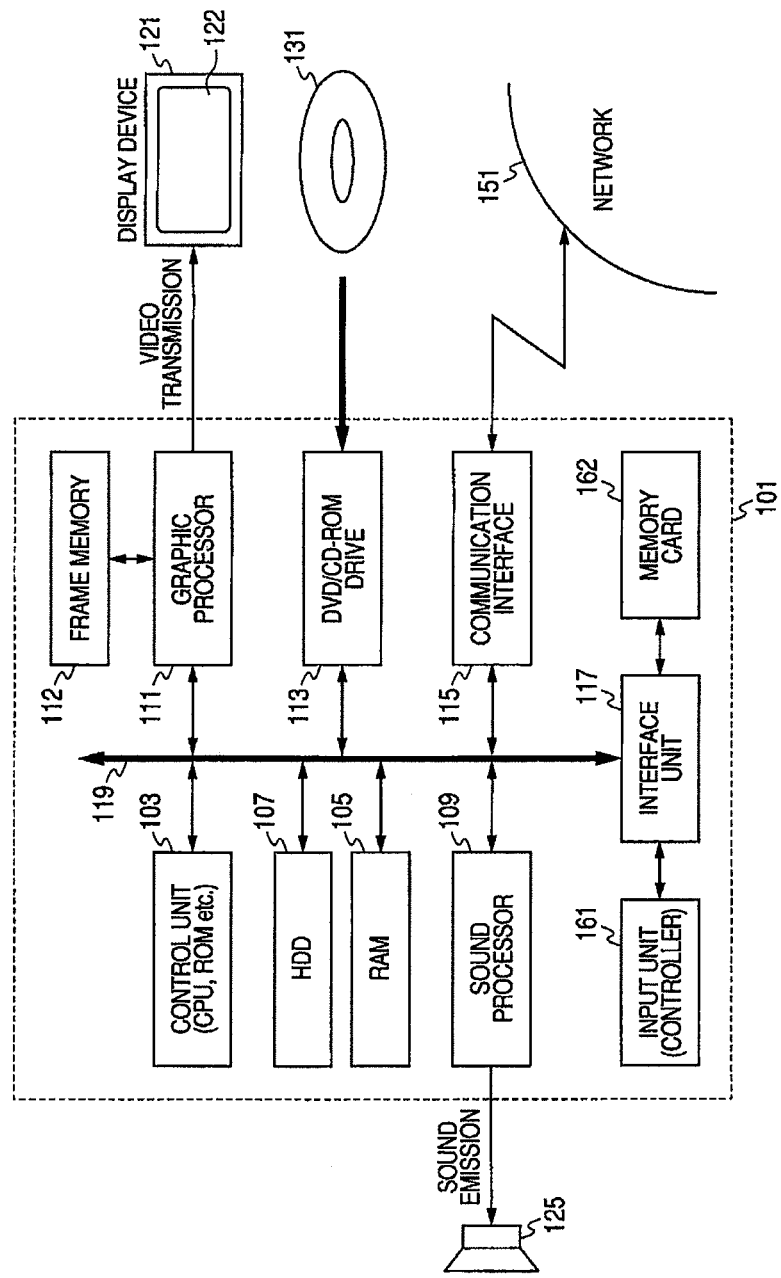
FIG. 2 is a block diagram showing a configuration of a video game apparatus of FIG. 1.

FIG. 2 is a block diagram showing a configuration of the video game apparatus 100 of FIG. 1. As shown in the figure, the video game apparatus 100 is constructed centered on an apparatus main body 101. The apparatus main body 101 includes a control unit 103, an RAM (Random Access Memory) 105, a hard disc drive (HDD) 107, a sound processor 109, a graphic processor 111, a DVD/CD-ROM drive 113, a communication interface 115 and an interface unit 117, connected to an internal bus 119 thereof.

The sound processor 109 of the apparatus main body 101 is connected to a sound emission device 125, which is a speaker, and the graphic processor 111 to a display device 121, which has a display screen 122. A recording medium (in the embodiment, a DVD-ROM or a CD-ROM) 131 can be loaded in the DVD/CD-ROM drive 113. The communication interface 115 is connected to the network 151. An input unit (a controller) 161 and a memory card 162 are connected to the interface unit 117.

The control unit 103, including a CPU (Central Processing Unit), an ROM (Read Only Memory) and the like, executes a program stored on the HDD 107 and recording medium 131, and carries out a control of the apparatus main body 101. The control unit 103 is equipped with an internal timer which keeps a current time. The RAM 105 is a work area of the control unit 103. The HDD 107 is a storage area for saving the program and data. The sound processor 109, in the event that the program being executed by the control unit 103 instructs a carrying out of a sound emission, interprets the instruction, and transmits a sound signal to the sound emission device 125.

The graphic processor 111, in accordance with a drawing command transmitted from the control unit 103, provides an image to a frame memory (a frame buffer) 112 (depicted on an outside of the graphic processor 111 in the figure, but provided inside the RAM which is included in a chip configuring the graphic processor 111), and transmits a video signal which displays the image on the display screen 122 of the display device 121. A one frame time of the image included in the video signal transmitted from the graphic processor 111 is, for example, one thirtieth of a second.

Naturally, as visible range information indicating objects, among objects existing in the game space, included in a visible range which is to be a display subject of the image is only transmitted from the game server apparatus 200 every one fifteenth of a second, the graphic processor 111 draws one image every two frames (that is, every one fifteenth of a second). Naturally, in the event that the visible range information cannot be received one fifteenth of a second after a reception of previous visible range information, an image drawn based on the previously received visible range information continues to be displayed. When offline, the graphic processor 111 can draw one image every frame (that is, every one thirtieth of a second).

The DVD/CD-ROM drive 113 carries out a reading of the program and data from the recording medium 131. The communication interface 115, being connected to the network 151, carries out a communication with another computer. The input unit 161, being equipped with a direction key and a plurality of operation buttons, moves the player character, to be described hereafter, by means of an operation of the direction key, and causes a carrying out of prescribed processes, such as speaking to the breeding character, by means of operations of the operation buttons. The direction key is also used for a movement of a cursor and the like, while the operation buttons are used for inputting prescribed instructions.

The interface unit 117 transmits the input data from the input unit 161 to the RAM 105, and the control unit 103 interprets it and implements a calculation process. The interface unit 117 also, based on an instruction from the control unit 103, saves data indicating a progress condition of the game stored in the RAM 105 in the memory card 162, reads data of the game when interrupted saved in the memory card 162, and forwards it to the RAM 105.

The program for carrying out the game with the video game apparatus 100, and the data, are first stored in, for example, the recording medium 131. As the data stored in the recording medium 131, graphic data for configuring the objects existing in the game space (the field formed in the game space, the player characters of one's self and other people, and the breeding characters of one's self and the other people) are all included. Consequently, as long as it is possible to receive the visible range, a position of each object included in the relevant visible range and, with regard to objects having a selective aspect (the player character and the breeding character), information which can specify the aspect, it is possible to draw the image displayed on the display screen 122 even without receiving the graphic data from the game server apparatus 200.

The program and the data stored in the recording medium 131 are read by the DVD/CD-ROM drive 113 at a time of execution, and loaded in the RAM 105. The control unit 103 processes the program and the data loaded in the RAM 105, transmits the drawing command to the graphic processor 111, and transmits the sound emission instruction to the sound processor 109. Intermediate data are stored in the RAM 105 while the control unit 103 is carrying out the processes.

Figure 3:
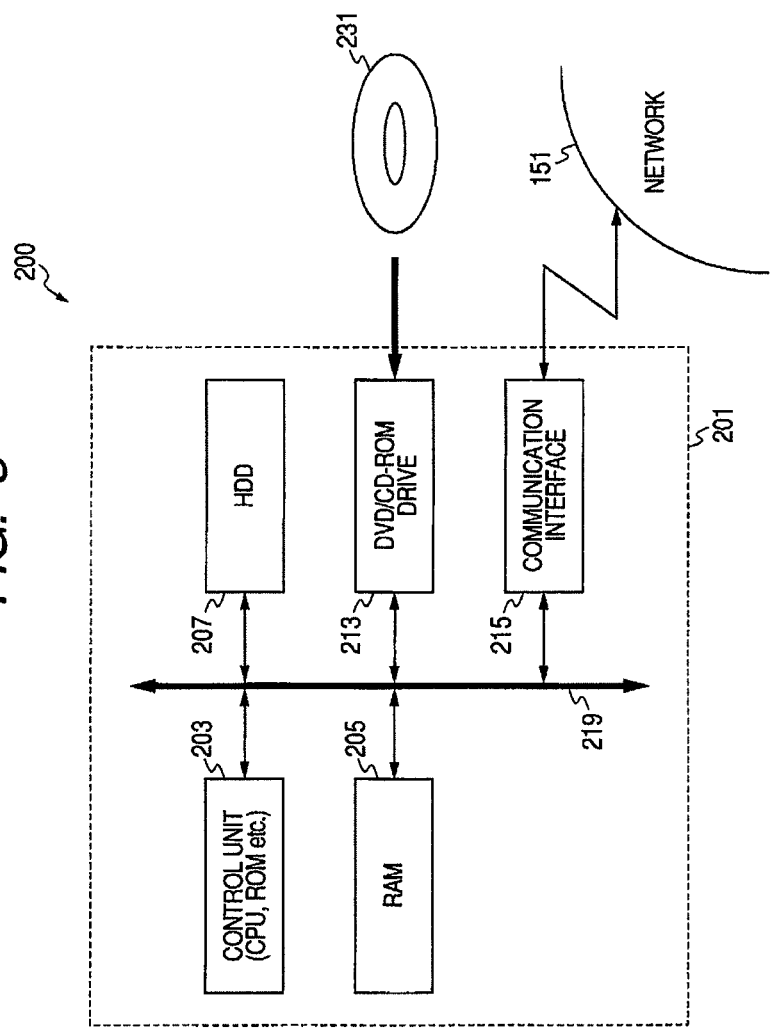
FIG. 3 is a block diagram showing a configuration of a game server apparatus of FIG. 1.

FIG. 3 is a block diagram showing a configuration of the game server apparatus 200 of FIG. 1. As shown in the figure, the game server apparatus 200 is constructed centered on a game server main body 201. The game server main body 201 includes a control unit 203, an RAM 205, a hard disc drive (HDD) 207, a DVD/CD-ROM drive 213 and a communication interface 215, connected to an internal bus 219 thereof. A recording medium (a DVD-ROM or a CD-ROM) 231 can be loaded in the DVD/CD-ROM drive 213.

The control unit 203, including a CPU (Central Processing Unit), an ROM (Read Only Memory) and the like, executes a program stored on the HDD 207 and recording medium 231, and carries out a control of the game server apparatus 200. The control unit 203 is equipped with an internal timer which keeps the current time. The RAM 205 is a work area of the control unit 203. The HDD 207 is a storage area for saving the program and data. The communication interface 215, being connected to the network 151, carries out the communication with each video game apparatus 100.

The program for carrying out a network game with the game server apparatus 200, and the data, are first stored in, for example, the recording medium 231, and then installed in the HDD 207. Then, the program and the data are read from the HDD 207 at a time of execution, and loaded in the RAM 205. The control unit 203 processes the program and the data loaded in the RAM 205, and implements the network game based on messages and the like sent from each video game apparatus 100. The intermediate data are stored in the RAM 205 while the control unit 203 is carrying out the processes.

Next, a description will be given of the breeding character bred by each player in the network game system according to the embodiment. FIGS. 4A to 4D show the breeding character. The breeding character, being a character in a bird form, grows in an order of an egg 300 shown in FIG. 4A, a chick 310 shown in FIG. 4B, young birds 320 and 320' shown in FIG. 4C, and grown birds 330 and 330' shown in FIG. 4D, in accordance with a number of days elapsing since a start of the breeding (updated at 4 a.m.). Although a different color is allotted to each breeding character, it does not happen that the color changes with a growth process. A number of breeding days of each breeding character is updated every time 4 a.m. comes around.

Figure 4A:
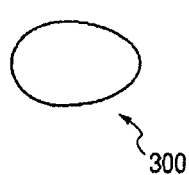
FIGS. 4A to 4D show breeding characters bred by each player in the embodiment of the invention.

The egg 300 shown in FIG. 4A is an aspect when the number of breeding days is zero, from the player starting the breeding of the breeding character until 4 a.m. first comes around. When the start of breeding of the breeding character is instructed by a player fulfilling a condition allowing the start of breeding of the breeding character, the egg 300 is laid at that point. Although the color of the breeding character is determined from a stage of the egg 300, it is acceptable either that the color is determined by a selection of the player, or that the color is determined by being allotted in the game server apparatus 200 based on a prescribed method.

Figure 4B:
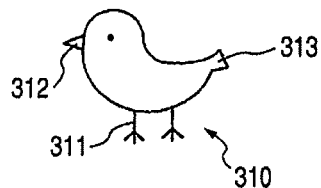

The chick 310 shown in FIG. 4B is an aspect when the number of breeding days of the breeding character is one to five. Although legs 311, a beak 312 and tail feathers 313 are included in the chick 310 as appendages thereof, it does not happen that a thickness of the legs 311, a length of the beak 312, and a size of the tail feathers 313 differ due to a difference in parameters set in the breeding character which is the chick 310. Consequently, in a condition of the chick 310, although the color varies depending on the breeding character, a form is exactly the same.

Figure 4C:
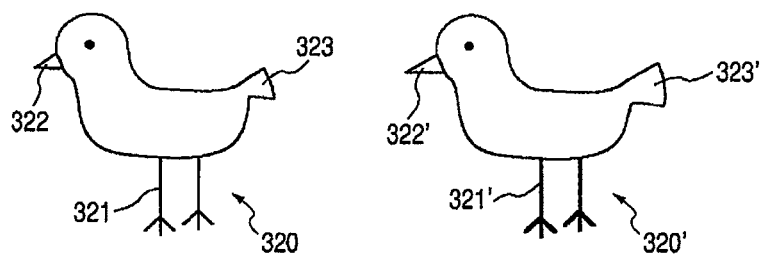

The young birds 320 and 320' shown in FIG. 4C are aspects when the number of breeding days of the breeding character is six to fifteen. Legs 321, a beak 322 and tail feathers 323 are included in the young bird 320 as appendages thereof. Legs 321', a beak 322' and tail feathers 323' are included in the young bird 320' as appendages thereof. The legs 321' of the young bird 320' are thicker than the legs 321 of the young bird 320 (a length is the same), the beak 322' of the young bird 320' is longer than the beak 322 of the young bird 320 (a thickness of a base is the same), and the tail feathers 323' of the young bird 320' are bigger than the tail feathers 323 of the young bird 320 (a thickness of a base is the same).

These kinds of difference in the thicknesses of the legs 321 and 321', the lengths of the beaks 322 and 322', and the sizes of the tail feathers 323 and 323' arise from differences in parameters of strength, stamina and judgment (all to be described hereafter) which are individually set in the breeding character. Meanwhile, a form apart from the appendages is exactly the same in the young birds 320 and 320', except for the difference in the color. The differences in the thicknesses of the legs 321 and 321', the lengths of the beaks 322 and 322', and the sizes of the tail feathers 323 and 323' can be optionally combined according to their parameters, as in a young bird of which the legs are thick, the beak is short and the tail feathers are small.

Figure 4D:
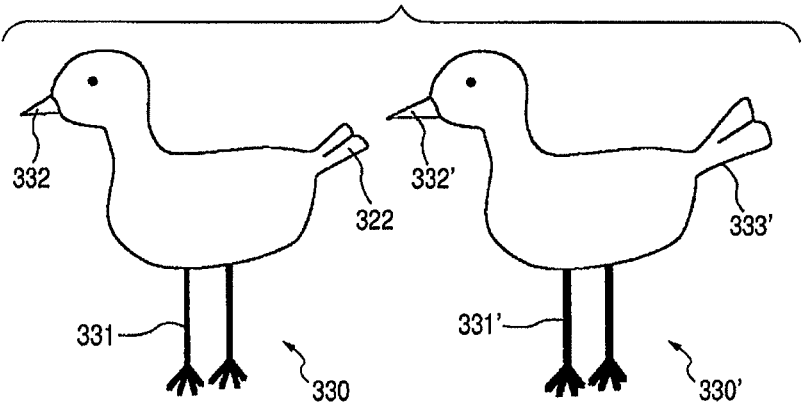

The grown birds 330 and 330' shown in FIG. 4D are aspects when the number of breeding days of the breeding character is sixteen to sixty. Legs 331, a beak 332 and tail feathers 333 are included in the grown bird 330 as appendages thereof. Legs 331', a beak 332' and tail feathers 333' are included in the grown bird 330' as appendages thereof. That the differences in the thicknesses of the legs 331 and 331', the lengths of the beaks 332 and 332', and the sizes of the tail feathers 333 and 333' arise from the differences in the parameters, and that the form apart from the appendages is the same except for the difference in the color, is the same as in the case of the young birds 320 and 320'.

As the breeding character can exist until the number of breeding days reaches sixty, when exceeding sixty days since the start of breeding, it reaches its allotted lifespan and ceases to exist. Also, it is only the breeding characters in the conditions of the grown birds 330 and 330' which can participate in the race. Each player, in the event that the breeding characters in breeding are only ones in the conditions of the grown birds 330 and 330', can start a breeding of a new breeding character. That is, it is possible for one player to breed up to a maximum of four breeding characters simultaneously.

Next, a description will be given of the game space of the game provided by the network game system according to the embodiment, and of the range (the visible range) of the relevant game space displayed on the display screen 122 of each player's video game apparatus 100. The game space, being the game space common to all the players participating in the game, is the hypothetical three-dimensional space in which is configured the field on which each player's player character and other characters (including the breeding characters) can move. An image, which has been perspective transformed from a first person point of view of the relevant player's player character, is displayed on the display screen 122 of the video game apparatus 100.

Figure 5A:
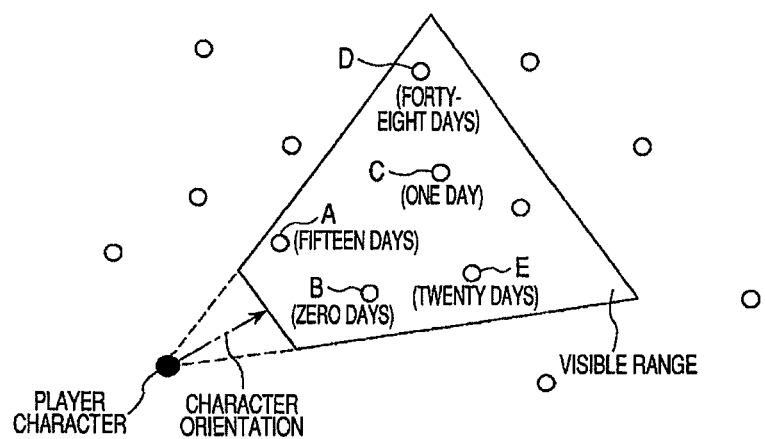

FIG. 5A shows the game space of the game provided by the network game system according to the embodiment. The player character of each player of the video game apparatuses 100 which are in the online condition exists in the game space (indicated in the figure by ●). Also, regardless of whether the video game apparatus 100 is in the online condition or the offline condition, all of the breeding characters being bred by the players exist (indicated in the figure by ○). In FIG. 5A, as there is only one video game apparatus 100 which is in the online condition, there is also only one player character existing.

A position and a direction of the player character in the game space are managed in the game server apparatus 200, as will be described hereafter. Also, a position and a direction of each breeding character in the game space are also managed in the game server apparatus 200, as will be described hereafter. As the image displayed on the display screen 122 in the video game apparatus 100 is perspective transformed from a first person point of view of the player character, the visible range which is to be the subject displayed on the display screen 122 is known based on the position and direction of the player character managed in the game server apparatus 200. A range of a trapezoid shown in FIG. 5A indicates a visible range perspective transformed from a forward clip surface to a rear clip surface.

In the case of FIG. 5A, five breeding characters A to E are included in the visible range of the player character in the game space. It is taken that the number of breeding days of the breeding characters A to E is fifteen, zero, one, forty-eight and twenty respectively. The visible range information including the position and direction, the number of breeding days, and various parameters (at least the strength, stamina and judgment which effect the form of the breeding characters A to E), to be described hereafter, of the breeding characters A to E included in the visible range, and a handle name of the player breeding the breeding character, is transmitted every one fifteenth of a second to the video game apparatuses 100 which are in the online condition (but which are not in the middle of a special event).

Figure 5B:
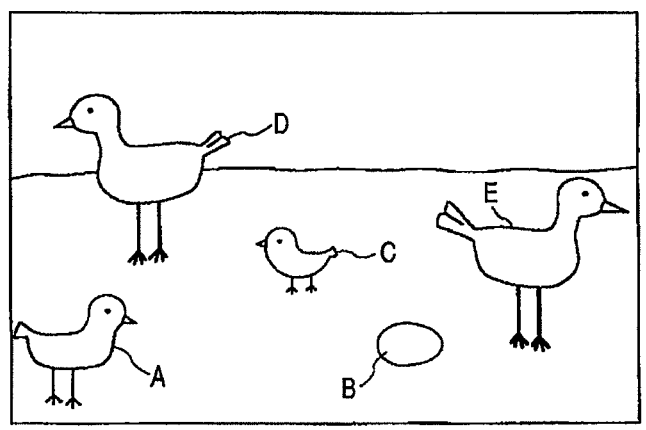
FIG. 5B shows a screen displayed in a case of FIG. 5A.

FIG. 5B shows an image displayed on the display screen 122 in the video game apparatuses 100 which have received the visible range information in the case of FIG. 5A. As the breeding character A with fifteen breeding days, the breeding character B with zero days, the breeding character C with one day, the breeding character D with forty-eight days, and the breeding character E with twenty days have been included in the visible range shown in FIG. 5A, the breeding characters A to E are displayed on the display screen 122 in the conditions of the young bird, the egg, the chick, the grown bird and the grown bird respectively.

Although, when carrying out the perspective transformation in the video game apparatus 100 in order to generate the image, it is necessary to determine the range thereof, as the position and direction of the relevant player's player character are managed in the video game apparatus 100 too, it is possible to carry out the perspective transformation of the image with a range which is the same as the visible range specified by the game server apparatus 200 from the first person point of view of the player character as a display subject range.

Although not shown in FIG. 5B, in order to be able to identify which player the breeding character belongs to, the handle name of the player breeding the breeding character is also displayed in the position of the breeding character. Also, the breeding character which the player is breeding by him or herself, in the event that it has not undergone a breeding event, to be described hereafter, is displayed on the display screen 122 in an aspect corresponding to the number of breeding days when a breeding plan in which the breeding event has not been undergone is selected, regardless of an actual number of days elapsing since the start of the breeding.

Next, a description will be given of data necessary for each player to implement the game, and breed the breeding characters, in the network game system according to the embodiment. The data shown in FIGS. 6 to 8 being only data regarding the breeding of the breeding character which especially need to be managed in the game server apparatus 200, a description of other necessary data will be added as appropriate.

FIG. 6 shows a player table provided in the RAM 205 inside the game server apparatus 200. As shown in the figure, a player ID (P-ID) 401, a password (PW) 402, a handle name (HN) 403, a player character aspect (PC aspect) 404, a position of the player character in the game space (PC position) 405, an orientation of the player character (PC orientation) 406, a final logging out date and time 407, a latest logging in date and time 408, and an event in progress flag 409 are registered for each player in the player table 400.

The player ID 401 is identification information which uniquely identifies each player. The password 402 being used for carrying out a user authentication for a player who has made a logging in request, in the event that a combination of a player ID and a password which have been transmitted along with the logging in request match a combination of the player ID 401 and the password 402 registered in the player table 400, the player is authenticated as a user, and can participate in the game. The handle name 403 being a name which each player uses in a game world, it does not happen that an identical handle name 403 is registered for differing players.

The player character aspect 404 indicates a player character aspect which the relevant player uses when playing the game. In the case of the player character aspect 404, a hairstyle, clothing and the like which the player decides when first participating in the game are registered. The player character position 405 indicates the position of the player character in the game space by coordinates set in the game space. The player character orientation 406 indicates the direction in which the player character is facing in a range of 0 to 359 degrees with, for example, a prescribed direction in the game space as a reference direction (a direction of 0 degrees).

The final logging out date and time 407 indicates a date and time at which the relevant player has last logged out. Although the final logging out date and time 407 is not deleted on a player's new logging in, it is deleted on the player selecting the breeding character's breeding plan. The latest logging in date and time 408 indicates a latest date and time at which the relevant player has logged in. The latest logging in date and time 408 is not registered for the player who is in the offline condition.

The event in progress flag 409 is a flag set for a player who is carrying out a growth event process, a race process, or a breeding plan selection process, all to be described hereafter. Although the visible range information is sent every one fifteenth of a second from the game server apparatus 200 to the video game apparatus 100 of the player who is in the online condition (that is, the player for whom the latest logging in date and time 408 has been registered), in the event that the event in progress flag 409 has been set, as an image differing from the image perspective transformed from the first person point of view of the player character is displayed in accordance with the event, the visible range information is not sent to the video game apparatus 100 of the player for whom the event in progress flag 409 has been set. Instead, information indicating the image in accordance with the event is sent to the video game apparatus 100 of the player for whom the event in progress flag 409 has been set.

FIG. 7 shows a breeding character table provided in the RAM 205 inside the game server apparatus 200. As shown in the figure, a breeding character ID (BC-ID) 501, a player ID (P-ID) 502, a breeding start date and time 503, a breeding character color (BC color) 504, a number of breeding days 505, strength 506, stamina 507, judgment 508, an HP 509, a stomach condition 510, an affection 511, a position of the breeding character in the game space (BC position) 512, an orientation of the breeding character (BC orientation) 513, and a breeding plan 514 are registered for each player in a breeding character table 500.

The breeding character ID 501 is identification information which uniquely identifies each breeding character. The player ID 502 is player identification of the player who is breeding the relevant breeding character. As it is possible for one player to breed up to a maximum of four breeding characters simultaneously, it can happen that the same player identification is registered for differing breeding characters. The breeding start date and time 503 indicates a date and time at which the breeding of the relevant breeding character has started. The breeding character color 504 indicates the color set for the relevant breeding character.

The number of breeding days 505 indicating the number of days elapsing since the breeding of the relevant breeding character has started, the breeding start time is zero days, and one day is added every time 4 a.m. comes around on each day.

The number of breeding days 505, as heretofore described, fixes the aspect of the breeding character as one of the egg 300, the chick 310, the young birds 320 and 320', or the grown birds 330 and 330'. Also, when 4 a.m. next comes around in a condition in which the number of breeding days 505 is sixty, a whole of the data of the relevant breeding character is deleted from the breeding character table 500.

The strength 506 is a parameter which indicates, when the breeding character which has become the grown bird 330 or 330' participates in the race, how fast it can run in the race. Also, the strength 506 is a parameter which fixes the thickness of the legs 321 and 321' of the breeding character which has become the young bird 320 or 320', and the thickness of the legs 331 and 331' of the breeding character which has become the grown bird 330 or 330'. The strength 506 is updated depending on training carried out for the breeding character in accordance with the breeding plan.

The stamina 507 is a parameter which indicates, when the breeding character which has become the grown bird 330 or 330' participates in the race, how far it can run in the race without consuming physical energy (HP). Also, the stamina 507 is a parameter which fixes the size of the tail feathers 323 or 323' of the breeding character which has become the young bird 320 or 320', and the size of the tail feathers 333 or 333' of the breeding character which has become the grown bird 330 or 330'. The stamina 507 is also updated depending on the training carried out for the breeding character in accordance with the breeding plan.

The judgment 508 is a parameter which indicates, when the breeding character which has become the grown bird 330 or 330' participates in the race, how skillfully it sets a running position in the race. Also, the judgment 508 is a parameter which fixes the length of the beak 322 or 322' of the breeding character which has become the young bird 320 or 320', and the length of the beak 332 or 332' of the breeding character which has become the grown bird 330 or 330'. The judgment 508 is also updated depending on the training carried out for the breeding character in accordance with the breeding plan.

The HP 509 is a parameter which indicates, when the breeding character which has become the grown bird 330 or 330' participates in the race, the physical energy remaining in the race. The HP 509 is decreased depending on a speed at which the breeding character which has become the grown bird 330 or 330' runs in the race, a distance run, and the stamina 507. In the event that the HP 509 becomes equal to or less than a prescribed value, it becomes unable to run at or faster than a certain speed and, in the event that the HP becomes zero, it becomes unable to do anything other than walk. The greater the HP 509 when participating in the race, the more advantageously the breeding character can implement the race.

The stomach condition 510 being a parameter which indicates how full a breeding character's stomach is, by giving food to the breeding character as care differing from the training according to the breeding plan, a value of the stomach condition 510 increases in accordance with an amount of the food given. Also, it can happen that the value of the stomach condition 510 decreases with the training according to the breeding plan. A value of the HP 509 increases or decreases, in accordance with the value of the stomach condition 510, when the number of breeding days 505 is updated at 4 a.m. every day. In the event that the value of the stomach condition 510 is lower than a lower limit value, the HP 509 is decreased, while in the event that it is equal to or higher than the lower limit value, and lower than an upper limit value, an increase amount of the HP 509 becomes larger by an amount dependent on the value of the stomach condition 510, but in the event that it exceeds the upper limit value, the value of the HP 509 is not increased.

The affection 511 being a parameter which indicates affection the player has put into the breeding of the breeding character, by caressing the breeding character as care differing from the training according to the breeding plan, a value of the affection 511 increases. A probability of a success or failure of the training for increasing the breeding character's strength 506, stamina 507 and judgment 508 depends on the value of the affection 511. Also, after reflecting a result of the training in the strength 506, stamina 507 and judgment 508 parameters, the value of the affection 511 decreases. That is, the higher the value of the affection 511, the higher a possibility of the training carried out for the breeding character in accordance with the breeding plan being judged to have succeeded, and the easier it is for the strength 506, stamina 507 and judgment 508 to increase.

The breeding character position 512 indicates the position of the breeding character in the game space by coordinates set in the game space. The breeding character orientation 513 indicates the direction in which the breeding character is facing in the range of 0 to 359 degrees with, for example, the prescribed direction in the game space as the reference direction (the direction of 0 degrees).

In the case of the breeding plan 514, a number of a breeding plan which the player has selected as the training to be carried out for the relevant breeding character is registered. The breeding plan number is allotted when the player selects the breeding plan. Details of the breeding plan (a daily training plan) are registered in a breeding information table, to be described separately hereafter. The breeding plan 514, in the event that the player character speaks to the relevant breeding character after carrying out the training based on the breeding plan, and the growth event process takes place, is deleted after the growth event process is finished along with the breeding information table, to be described hereafter.

FIG. 8 shows the breeding information table provided in the RAM 205 inside the game server apparatus 200. The breeding information table 600 is compiled when the player character speaks to the breeding character, and selects the breeding plan. However, when the breeding information table 600 according to a breeding plan selected previous to that has been stored, after the breeding event has occurred in accordance with the relevant stored breeding information table 600, a new breeding plan is selected, and the breeding information table 600 is compiled. Also, even though the player character speaks to the breeding character, in the event that the breeding plan from a previous logging out until a current logging in has already been selected, it does not happen that the breeding plan is further selected.

As shown in the figure, a breeding plan number 601, a logging out time number of breeding days 602, a daily training plan 603 based on the number of days elapsing from the final logging out date and time to the current logging in date and time, and training details of the daily training plan 604 are registered in the breeding information table 600. The breeding plan number 601 being a number uniquely allotted when the player selects the breeding plan at a selection time of the breeding plan, a number is registered which is the same as the one registered in the breeding plan 514 of the breeding character table 500.

The logging out time number of breeding days 602 indicates the number of breeding days of the relevant breeding character at a point of the final logging out previous to the selection of the relevant breeding plan. Regarding the breeding character for which the breeding character table 600 remains (that is, for which the growth event caused by speaking to the relevant breeding character has not occurred), the breeding character is displayed as one of the aspects among the egg 300, the chick 310, the young birds 320 and 320', or the grown birds 330 and 330' in accordance not with a number of growth days of the breeding character included in the visible range information, but with the number of breeding days registered in the logging out time number of breeding days 602.

The daily training plan 603 indicates the details of the daily training which the player should carry out for the relevant breeding character based on the number of days from the final logging out to the current logging in. It is sufficient that the player administers the training based on the daily training plan 603 to the breeding character. The training including differing training for an area to be developed among the strength 506, the stamina 507 and the judgment 508, what training is to be carried out is fixed in the daily training plan 603 too.

Individual degrees of difficulty being fixed in the daily training plan 603, the lower the degree of difficulty of the training, the higher the possibility of it being determined to have succeeded in a success determination, to be described hereafter. To select the breeding plan being to select the daily training plan, selection candidates thereof are extracted in the game server apparatus 200, and the player selects the daily training plan from among the extracted selection candidates. Also, the training plan which the player can select as the daily training plan 603 differs depending on a growth stage (the chick 310, the young birds 320 and 320', or the grown birds 330 and 330') of the breeding character.

In the case of the daily training details 604, the details of the training which the player has actually carried out for the breeding character with respect to the daily training plan 603 are registered. Although the player does not necessarily have to carry out the training for the breeding character as laid out in the daily training plan 603, even though carrying out training which is completely different from the training plan, with the exception of a case of a coincidental success, to be described hereafter, it does not happen that the training of the relevant day is determined to have succeeded. In a case in which the training itself is not carried out, the training is always determined to have failed.

Next, a description will be given of an update of the parameters, among the parameters set for each breeding character and registered in the breeding character table 500, the strength 506, the stamina 507 and the judgment 508. When the player character speaks to the relevant breeding character during the implementation of the game, the success determination is made for each day by comparing the daily training plan 603 and the daily training details 604, and the parameters of the breeding character the strength 506, the stamina 507 and the judgment 508 are updated depending on whether the determination result is the success or the failure.

When the player character speaks to the breeding character during the implementation of the game, in the event that details of the relevant breeding character are registered in the breeding information table 600, the success or failure is determined by the server game apparatus 200 for each of the daily training details 604, the parameters the strength 506, the stamina 507 and the judgment 508 are increased or decreased in accordance with the determination result and the training plan of the relevant day (specified by the breeding plan 514), and the parameter affection 511 is decreased.

The success or failure of the daily training is determined in the following way. First, each one day's worth of the training details are read sequentially from a training of the first day, but in the event that nothing has been registered as the training details, the training of the relevant day is always determined to have been the failure. In the event that some kind of details are registered as the training details, a random number in a range of zero to the value of the affection 511 is extracted. In the event that a value of the extracted random number is zero, the training of the relevant day is always determined to have been the failure, while in the event that the value of the extracted random number is equal to or greater than a prescribed value, the training of the relevant day is always determined to have been the success. That is, the higher the value of the affection 511, the higher a possibility of the random number equal to or greater than the prescribed value being extracted, so the possibility of the training being determined to have succeeded increases.

In the event that the value of the extracted random number is neither zero nor equal to or greater than the prescribed value, an attack value is calculated based on the details of the training of the relevant day, the value of the extracted random number, and the value of the affection 511. However, in the event that the details of the training of the relevant day completely fail to match the training plan of the relevant day, zero is calculated as the attack value. Also, the higher the value of the affection 511, the higher the value of the calculated attack value, so the possibility of the training being determined to have succeeded increases. Then, it is determined whether or not the calculated attack value is higher than a degree of difficulty fixed in accordance with the training plan of the relevant day. In the event that the calculated attack value is higher than the degree of difficulty of the training plan, the training of the relevant day is determined to have been the success, while in the event that the calculated attack value is equal to or lower than the degree of difficulty of the training plan, the training of the relevant day is determined to have been the failure.

In a case in which the training is determined to have been the success as described heretofore, the parameters the strength 506, the stamina 507 and the judgment 508 are caused to be updated by a success pattern fixed for the training plan of the relevant day. Herein, although a value by which each of the strength 506, the stamina 507 and the judgment 508 is increased or decreased in accordance with the training plan differs, when the amounts of increase or decrease of each parameter are added together, they always result in a positive number (it can happen that there is no parameter at all of the strength 506, the stamina 507 and the judgment 508 which is not decreased). Also, the higher the degree of difficulty of the training determined to have succeeded, the higher the amount of increase of the parameters the strength 506, the stamina 507 and the judgment 508 as a whole. Also, the affection 511 is decreased by the value fixed in the relevant success pattern.

Meanwhile, in a case in which the training is determined to have been the failure, the parameters the strength 506, the stamina 507 and the judgment 508 are caused to be updated by a failure pattern fixed for the training plan of the relevant day. Herein, although a value by which each of the strength 506, the stamina 507 and the judgment 508 is increased or decreased in accordance with the training plan differs, when the amounts of increase or decrease of each parameter are added together, they always result in a negative number (it can happen that there is no parameter at all of the strength 506, the stamina 507 and the judgment 508 which is not increased). Also, the affection 511 is decreased by the value fixed in the relevant failure pattern.

In the case in which the success or failure of the training plan is determined every day in this way, and the strength 506, the stamina 507 and the judgment 508 are updated in accordance with the determination result, the growth event occurs which indicates the growth of the breeding character in accordance with the daily update of the parameters, and an appearance of the breeding character growing every day is shown to the player as an image displayed on the display screen 122 of the video game apparatus 100.

To describe more specifically, in the event that the corresponding breeding information table 600 is registered when the player character speaks to the breeding character, the game server apparatus 200, having not yet reflected the daily training details in the parameters, including the values of the strength 506, the stamina 507 and the judgment 508 of the relevant breeding character registered in the breeding character table 500, transmits growth event information, which instructs a display of a growth process of the breeding character in accordance with the logging out time number of breeding days 602, to the video game apparatus 100. The image of the breeding character according to the values of the parameters and the logging out time number of breeding days 602 is caused to be displayed on the display screen 122 in the video game apparatus 100.

Also, every time the strength 506, the stamina 507 and the judgment 508 of the relevant breeding character are updated in accordance with the daily training details, the game server apparatus 200 transmits the growth event information which instructs the display of the growth process of the breeding character until the relevant day, including the updated values of the strength 506, stamina 507 and judgment 508, and the number of days reflecting the training details (for example, in the event that the parameters have been updated reflecting the first day training details, the logging out time number of breeding days 602+one day), to the video game apparatus 100. The image of the breeding character according to the values of the parameters, and the logging out time number of breeding days 602+the number of days on which the training details have been generated, is caused to be displayed on the display screen 122 in the video game apparatus 100.

Hereafter, a description will be given of processes executed in the network game system according to the embodiment. Herein, the description will be centered on processes executed in the game server apparatus 200, and processes executed in the video game apparatuses 100 which are in the online condition will be described as appropriate in the description of the processes of the game server apparatus 200.

Figure 9:
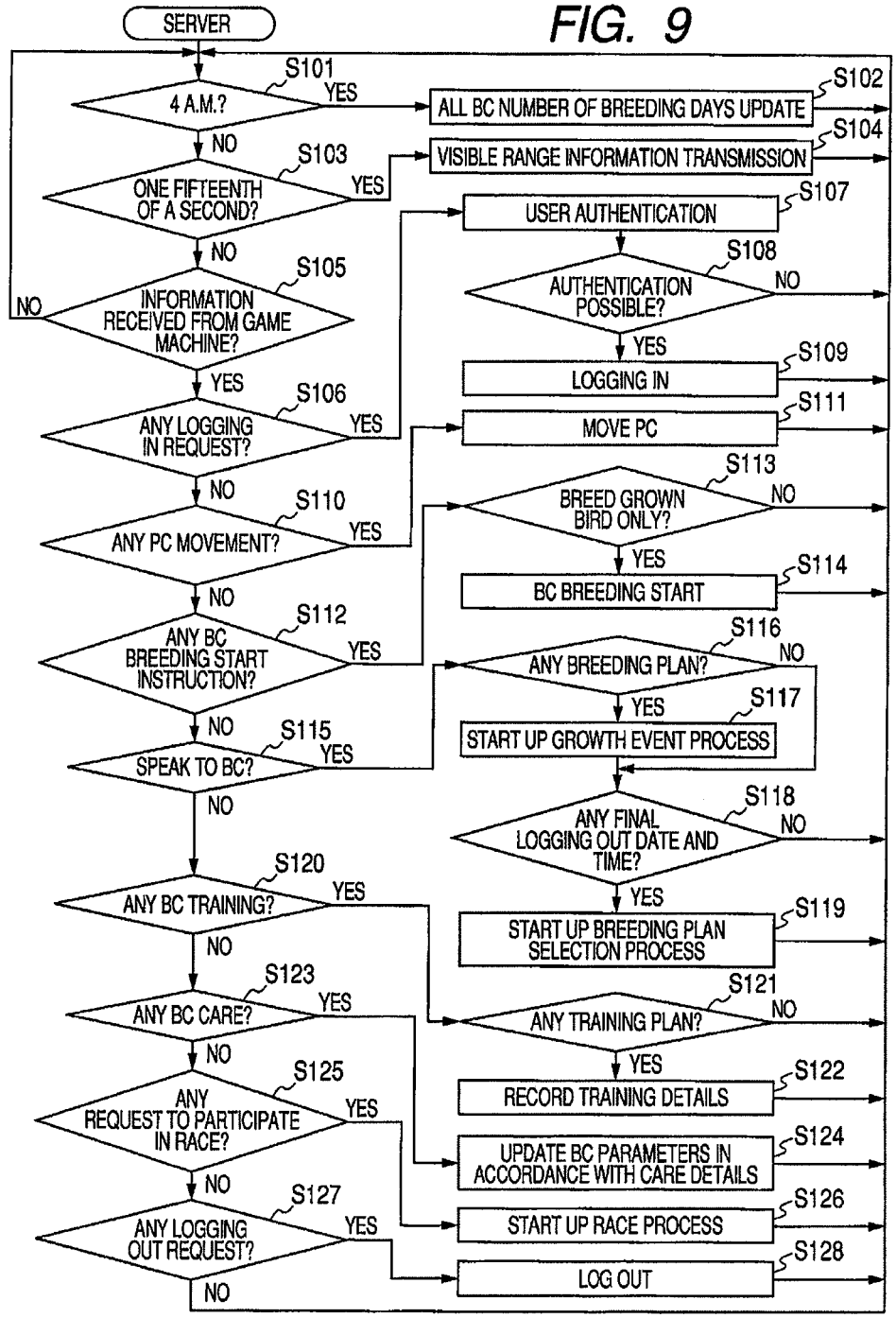
FIG. 9 is a flowchart showing processes executed in the game server apparatus in the network game system according to the embodiment of the invention.

FIG. 9 is a flowchart showing the processes executed in the game server apparatus 200 according to the embodiment. Although the processes executed in the game server apparatus 200 include processes other than steps shown in the flowchart of FIG. 9, steps executed relating particularly to the invention are shown in FIG. 9.

In the game server apparatus 200, the control unit 203 determines whether or not the internal timer has registered exactly 4 a.m. (step S101). In the event that the internal timer has registered exactly 4 a.m., the control unit 203 increases the number of breeding days 505 of each breeding character registered in the breeding character table 500 by one day each. Data of a breeding character of which the number of breeding days 505 has reached sixty-one days as a result of the increase are deleted from the breeding character table 500. Also, the control unit 203 increases or decreases the HP 509 in accordance with the value of the stomach condition 510 of each breeding character, along with which it initializes the value of the stomach condition 510 at zero (step S102). Then, the control unit 203 returns to the process of step S101.

In the event that the internal timer has not registered 4 a.m., the control unit 203 determines whether or not the internal timer has registered a time every one-fifteenth of a second (step S103). It is taken that the time of exactly 4 a.m. does not coincide with the case in which the internal timer registers the time every one-fifteenth of a second.

In the event that the internal timer has registered the time every one-fifteenth of a second, the control unit 203 specifies the visible range in accordance with the position 405 and the orientation 406 of the player character for each player who is in the online condition (that is, for whom the latest logging in time 408 has been registered), and for whom the growth event of the breeding character, the race and the like are not being carried out (that is, for whom the event in progress flag 409 has not been set). The control unit 203, referring to the player table 400 and the breeding character table 500, generates the visible range information including as the information the position and orientation of the player characters of the other players included in the visible range (however, only those in the online condition), and the position and orientation of the breeding characters included in the visible range, and transmits it from the communication interface 215 to the video game apparatus 100 of the relevant player (step S104). Then, the control unit 203 returns to the process of step S101.

The visible range information transmitted in step S104 is received by the communication interface 115 of the video game apparatus 100. In the video game apparatus 100 which has received the visible range information, the control unit 103 perspective transforms the game space from the first person point of view according to the position and direction of the player character. The objects included in the perspective transformed range include not only the field (a landscape and buildings) formed in the game space, but also the player characters of the other players included in the visible range information, and the breeding characters of the player and the other players.

Herein, regarding each breeding character, the breeding character is displayed as the aspect (a distinction between the egg, the chick, the young birds and the grown birds) corresponding to the number of breeding days included in the visible range information and, in the cases of the young birds and the grown birds, by the thickness of the legs, the size of the tail feathers and the length of the beak according to the parameters the strength, the stamina and the judgment. Regarding the player's breeding character, in the event that the breeding information table 600 is still registered, as the logging out time number of breeding days 602 registered in the breeding information table 600, rather than the number of breeding days 505 registered in the breeding character table 500, is included in the visible range information, the breeding character is displayed as the aspect corresponding to the logging out time number of breeding days 602.

In the event that the internal timer is not registering the time every one-fifteenth of a second in step S103, the control unit 203 determines whether or not any kind of information is being received from any video game apparatus 100 (including those not yet logged in) (step S105). In the event that the information is not being received from any video game apparatus 100, the control unit 203 returns directly to the process of step S101.

In the event that some kind of information is being received from any one of the video game apparatuses 100, the control unit 203 determines whether or not the received information is a logging in request (step S106). In the event that the received information is a logging in request, the control unit 203 compares the player identification and password transmitted along with the relevant logging in request with the player ID 401 and the password 402 registered in the player table 400, and carries out the user authentication for the player of the relevant video game apparatus 100 (step S107).

As a result, it is determined whether or not the relevant player has been authenticated as a legitimate player having an entitlement to participate in the game (step S108). In the event that the player identification and password transmitted along with the logging in request are not registered in the player table 400, and it is not possible to authenticate the relevant player, the control unit 203 refuses the logging in of the user from the relevant video game apparatus 100, and returns directly to the process of step S101. In the event that the player identification and password transmitted along with the logging in request are registered in the player table 400, and it is possible to authenticate the relevant player, the control unit 203 accepts the logging in of the relevant player, and records the latest logging in date and time 408 in the player table 400 (step S109). Then, the control unit 203 returns to the process of step S101.

In the event that the received information is not the logging in request, the control unit 203 determines whether or not the received information indicates a movement (including a direction transformation) of the player character in the game space (step S110). In the event that it indicates the movement of the player character, the control unit 203, in accordance with the relevant received information, updates the position 405 and/or the orientation 406 of the player character registered in the player table 400 for the player of the video game apparatus 100 which has transmitted the relevant information (step S111). Then, the control unit 203 returns to the process of step S101.

In the event that the received information does not indicate the movement of the player character, the control unit 203 determines whether or not the received information instructs the start of breeding of the breeding character (step S112). In the event that it instructs the start of breeding of the breeding character, the control unit 203 determines whether or not, in the breeding character table 500, the number of breeding days 505 of the breeding characters corresponding to the player ID 502 of the player of the video game apparatus 100 which has transmitted the relevant information are all sixteen days or more, that is, it determines whether or not the breeding characters which the relevant player is breeding are all in the condition of the grown bird 330 or 330' (step S113).

In the event that the relevant player is breeding the breeding character of which the number of breeding days is fifteen or less, it not being possible at this point to start the breeding of a new breeding character, the control unit 203 returns directly to the process of step S101. In the event that the relevant player is breeding only the breeding characters of which the number of breeding days is sixteen or more, the control unit 203 issues anew the breeding character ID 501, decides the color 504 of the breeding character, fixes the position 512 and the orientation 513 of the breeding character in accordance with a position in which the player character is currently positioned, registers a record for the new breeding character in the breeding character table 500, and starts the breeding of the new breeding character (step S114). Then, the control unit 203 returns to the process of step S101.

In the event that the received information does not instruct the start of breeding of the breeding character, the control unit 203 determines whether or not the received information indicates that the player character of the player of the video game apparatus 100 which has transmitted the relevant information has spoken to its own breeding character (step S115). In the event that it indicates the speaking to the breeding character, the control unit 203 determines whether or not the breeding plan 514 for the relevant breeding character has been registered in the breeding character table 500 (step S116). In the event that the breeding plan 514 has not been registered, the control unit 203 proceeds directly to a process of step S118.

In the event that the breeding plan 514 has been registered, the control unit 203, as well as setting the event in progress flag 409 of the player table 400 for the relevant player, starts up the growth event process, details of which will be described hereafter (step S117). After the growth event process is completed, the control unit 203 proceeds to the process of step S118.

In step S118, the control unit 203 determines whether or not the final logging out date and time 408 has been registered in the player table 400. In the event that the final logging out date and time 408 has not been registered, as the breeding plan based on a number of days elapsing from the final logging out until a current logging out has already been selected, the control unit 203 returns directly to the process of step S101.

Meanwhile, in the event that the final logging out date and time 408 has been registered, the breeding plan based on the number of days elapsing from the final logging out until the current logging out has not yet been selected. In this case, the control unit 203, as well as setting the event in progress flag 409 of the player table 400 for the relevant player, starts up the breeding plan selection process, details of which will be described hereafter (step S119). After the breeding plan selection process is completed, the control unit 203 returns to the process of step S101.

In the event that the information received in step S115 does not indicate the speaking to the breeding character, the control unit 203 determines whether or not the received information instructs the training of the breeding character (step S120). In the event that it instructs the training of the breeding character, the control unit 203 determines whether or not the training plan 603 not registered with the training details 604 correlated has been registered in the breeding information table 600 for the relevant breeding character (step S121). In the event that the training plan 603 not registered with the training details 604 correlated has not been registered, the control unit 203 returns directly to the process of step S101. In the event that the training plan 603 not registered with the training details 604 correlated has been registered, the control unit 203 registers the details of the training carried out as the training details 604 of the relevant day in the breeding information table 604 (step S122). Then, the control unit 203 returns to the process of step S101.

In the event that the received information does not instruct the training of the breeding character, the control unit 203 determines whether or not the received information instructs the care of the breeding character outside the breeding plan (giving the food to the breeding character, or caressing the breeding character) (step S123). For example, in a condition in which the player character is within a certain range from the breeding character, when the player operates a prescribed button of the input unit 161 in the video game apparatus 100, the giving of food to the breeding character, or the caressing of the breeding character, is instructed. Depending on the instruction, the control unit 103 transmits information indicating details of the care given from the communication interface 115 to the video game apparatus 100.

In the event that the received information indicates the care of the breeding character transmitted in accordance with the instruction of the player of the video game apparatus 100, the control unit 203 increases the parameters the stomach condition 510 or the affection 511 registered in the breeding character table 500 for the relevant breeding character in accordance with the details of the care indicated by the relevant information (step S124). Then, the control unit 203 returns to the process of step S101.

In the event that the received information is not the care of the breeding character either, the control unit 203 determines whether or not the received information is requesting that the breeding character is allowed to participate in the race (step S125). In the event that the received information is requesting to be allowed to participate in the race, the control unit 203, as well as setting the event in progress flag 409 of the player table 400 for the relevant player, starts up the race process, and allows a designated breeding character to participate in the race (step S126). Then, the control unit 203 returns to the process of step S101.

In the race process, when a specified number or more of the breeding characters which have requested the participation in the race in the same way gather, the race is started. The breeding characters which participate in the race, when the value of the HP 509 is sufficient, can run at a speed commensurate with the value of the strength 506 and, the higher the value of the judgment 508, the closer they can run to a course of a shortest distance. Herein, the value of the HP 509 being decreased in accordance with a distance run and the value of the stamina 507, when the HP 509 becomes lower than a certain value, the running speed becomes slower, and when it becomes zero, the breeding character becomes unable to do anything other than walk. When the race finishes, the event in progress flag 409 is reset.

In the event that the received information is not requesting that the breeding character is allowed to participate in the race either, the control unit 103 determines whether or not the received information is a logging out request (step S127). In the event that the received information is the logging out request, the control unit 203 registers a current date and time as the final logging out date and time 407 for the player of the video game apparatus 100 which has transmitted the logging out request, deletes the latest logging in date and time 408, and causes the relevant video game apparatus 100 to log out (step S128). Then, the control unit 203 returns to the process of step S101. In the event that the received information is not the logging out request either, the control unit 203 returns directly to the process of step S101.

Figure 10:
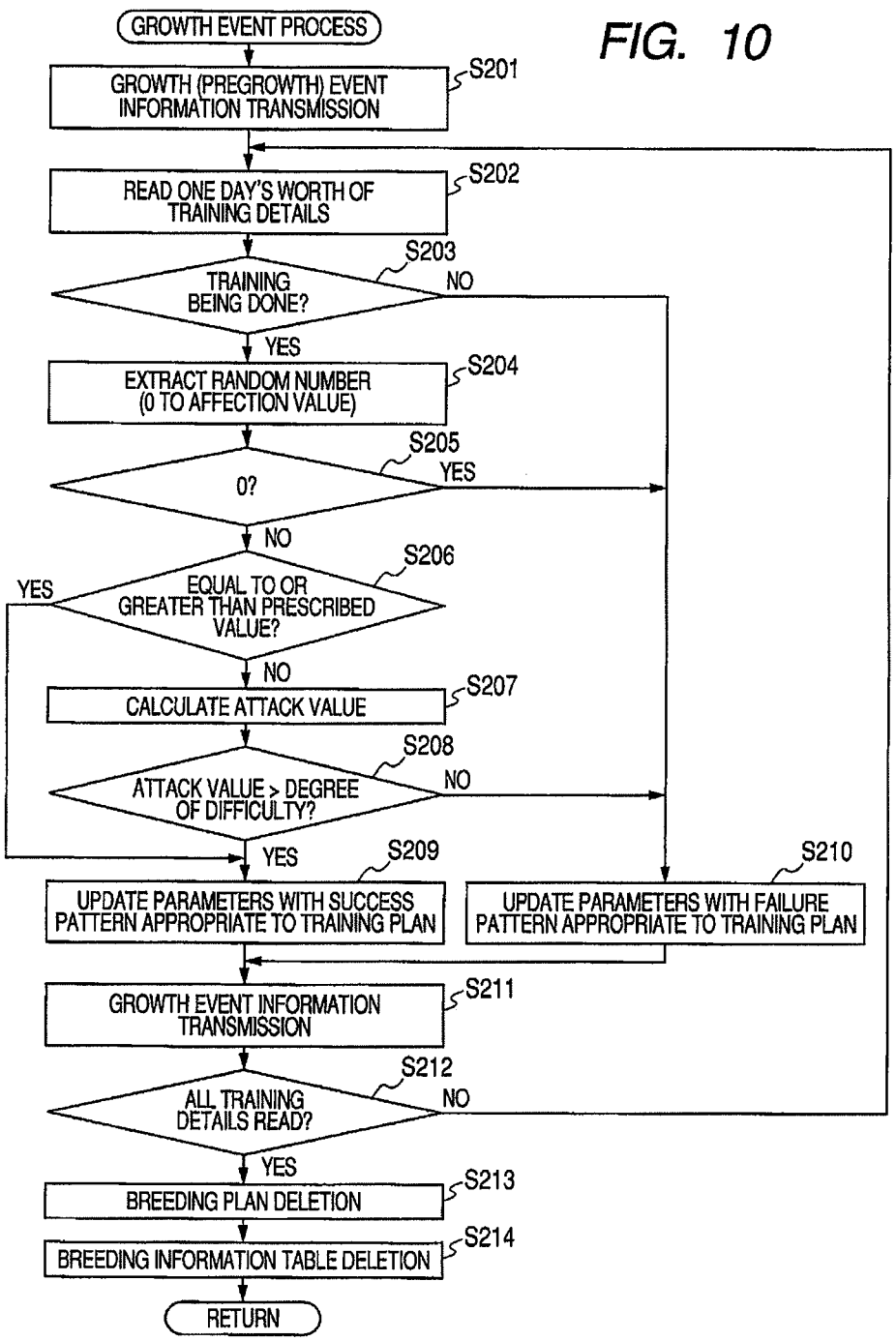
FIG. 10 is a flowchart showing in detail a growth event process.

Next, a detailed description will be given of the growth event process started up by step S117. FIG. 10 is a flowchart showing in detail the growth event process started up in step S117. Firstly, the control unit 203 of the game server apparatus 200 reads the strength 506, the stamina 507 and the judgment 508 for the relevant breeding character from the breeding character table 500, and transmits the growth event information which, as well as including the values of these parameters, instructs the display of the breeding character in the condition of the logging out time number of breeding days 602 registered in the breeding information table 600, to the video game apparatus 100 which has carried out the speaking to the breeding character (step S201). In order that the screen in the video game apparatus 100 does not change too rapidly, the control unit 203, after transmitting the growth event information, calls a halt until a certain time has elapsed.

In the video game apparatus 100, on the communication interface 115 receiving the growth event information, in accordance with a control of the control unit 103, the image of the breeding character according to the values of the parameters the strength 506, the stamina 507 and the judgment 508 included in the received growth event information, and the logging out time number of breeding days 602, is displayed on the display screen 122.

Next, the control unit 203, with the breeding plan 514 of the relevant breeding character registered in the breeding character table 500 as a key, reads the one day's worth of the training details sequentially from the first day among the daily training details 604 registered in the breeding information table 600 (step S202). The control unit 203 determines whether or not a fact that some kind of training has been carried out has been recorded in the read training details (step S203). In the event that no fact of any kind of training having been carried out has been recorded in the read training details, as the training of the relevant day is always determined to have been the failure, the control unit 203 proceeds directly to a process of step S210.

In the event that the fact that some kind of training has been carried out has been recorded in the read training details, the control unit 203 extracts the random number (an integer) in the range of zero to the value of the affection 511 (step S204). The control unit 203 determines whether or not a value of the extracted random number is zero (step S205). In the event that the value of the extracted random number is zero, as the training of the relevant day is unconditionally determined to have been the failure, the control unit 203 proceeds to the process of step S210. In the event that the value of the extracted random number is not zero, the control unit 203 determines whether or not the value of the extracted random number is equal to or greater than a prescribed value (step S206). In the event that the value of the extracted random number is equal to or greater than the prescribed value, as the training of the relevant day is unconditionally determined to have been the success, the control unit 203 proceeds to a process of step S209.

In the event that the value of the extracted random number is one or greater, and less than the prescribed value, the control unit 203 calculates the attack value based on the details of the training of the relevant day, the value of the extracted random number, and the value of the affection 511 (step S207). The control unit 203 determines whether or not the calculated attack value is higher than the degree of difficulty fixed corresponding to the training plan of the relevant day (step S208). In the event that the calculated attack value is higher than the degree of difficulty corresponding to the training plan of the relevant day, as the training of the relevant day is determined to have been the success, the control unit 203 proceeds to the process of step S209. In the event that the calculated attack value is equal to or lower than the degree of difficulty corresponding to the training plan of the relevant day, as the training of the relevant day is determined to have been the failure, the control unit 203 proceeds to the process of step S210.

In step S209, the control unit 203 increases or decreases the parameters the strength 506, the stamina 507 and the judgment 508 registered in the breeding character table 500 for the relevant breeding character, with the success pattern applied when the training plan of the relevant day has succeeded. Also, the control unit 203 decreases the parameter the affection 511 by the value fixed by the relevant success pattern. Then, the control unit 203 proceeds to a process of step S211.

Meanwhile, in step S210, the control unit 203 increases or decreases the parameters the strength 506, the stamina 507 and the judgment 508 registered in the breeding character table 500 for the relevant breeding character, with the failure pattern applied when the training plan of the relevant day has failed. Also, the control unit 203 decreases the parameter the affection 511 by the value fixed by the relevant failure pattern. Then, the control unit 203 proceeds to the process of step S211.

In step S211, the control unit 203 reads the strength 506, the stamina 507 and the judgment 508, after the update, from the breeding character table 500 for the relevant breeding character, and transmits the growth event information, including the values of these parameters and the number of days reflecting the training result, which instructs the display of the breeding character to the video game apparatus 100. In order that the screen in the video game apparatus 100 does not change too rapidly, the control unit 203, after transmitting the growth event information, calls the halt until the certain time has elapsed.

In the video game apparatus 100, on the communication interface 115 receiving the growth event information, in accordance with the control of the control unit 103, the image of the breeding character according to the values of the parameters the strength 506, the stamina 507 and the judgment 508 included in the received growth event information, and the logging out time number of breeding days 602+the number of days reflecting the training details, is displayed on the display screen 122.

Next, the control unit 203 determines whether or not all of the daily training details 604 registered in the breeding information table 600 have been read (step S212). In the event that there are some among the daily training details 604 which have not yet been read, the control unit 203 returns to the process of step S202, and reads training details of a next day. In the event that all of the daily training details 604 have been read, the control unit 203 deletes the breeding plan 514 registered in the breeding character table 500 for the relevant breeding character, and resets the event in progress flag 409 registered in the player table 400 for the relevant player (step S213). Furthermore, the control unit 203 deletes the relevant breeding information table 600 itself from the RAM 205 (step S214). Then, the growth event process is completed.

Figure 11:
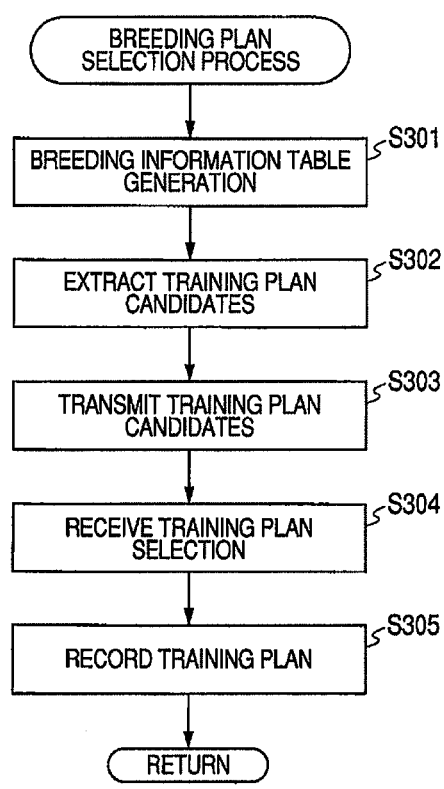
FIG. 11 is a flowchart showing in detail a training plan selection process.

Next, a detailed description will be given of the training plan selection process started up in step S119. FIG. 11 is a flowchart showing in detail the training plan selection process started up in step S119. The control unit 203, as well as issuing the new training plan number and registering it as the training plan 514 of the breeding character table 500, generates a number of days elapsing from the final logging out date and time 408 to the latest logging in date and time 409 worth of training plans 603 and training details 604, and stores them in the RAM 122 (step S301).

Next, the control unit 203, a plurality of patterns being prepared in accordance with the growth process of the breeding character, extracts the training plan, from among the daily training plans stored in the HDD 207, commensurate with the number of days elapsing from the final logging out date and time 408 to the latest logging in date and time 409. For example, with respect to a breeding character for which the logging out time number of breeding days 602 is five, in a case in which the number of days elapsing from the final logging out date and time 408 to the latest logging in date and time 409 is two, a plurality of kinds (even all the kinds) of training plan which can be applied to the breeding character in the condition of the chick is extracted, and a plurality of kinds of training plan which can be applied to the breeding character in the condition of the young bird is extracted (step S302).

The control unit 203 transmits the extracted daily training plans as the training plan candidates from the communication interface device 215 to the video game apparatus 100 which has transmitted the instruction of the speaking to the breeding character (step S303). The training plan candidates transmitted in step S303 are received by the communication interface 115 of the video game apparatus 100. In the video game apparatus 100 which receives these, the control unit 103 displays a list of the training plan candidates every day and, in accordance with the list display screen, the player selects the daily training plan by operating the input unit 161.

The selected daily training plan is transmitted from the communication interface 115 to the game server apparatus

200. Then, on the training plan transmitted from the video game apparatus 100 being received by the communication interface 215 (step S304), the control unit 203 registers it in the breeding information table 600 as the daily training plan 603. On the training plan 603 being registered, the final logging out date and time 408 is deleted from the player table 400 (step S305). Then, the training plan selection process is completed.

As heretofore described, in the network game system according to the embodiment, although the breeding character grows in the order of the egg 300→the chick 310→the young birds 320 and 320'→the grown birds 330 and 330', this kind of difference between major aspects occurs only because of a difference in the number of breeding days 505. The color 504 of the breeding character remains the same from the start of the breeding until the end. However, when the breeding character has the aspect of the young bird or the grown bird, the aspects of ancillary portions, which are the thickness of the legs, the size of the tail feathers and the length of the beak, differ in accordance with the values of the strength 506, the stamina 507 and the judgment 508 respectively.

Herein, when the player character speaks to the breeding the character during the implementation of the game, a number of days worth of the training plan candidates corresponding to the number of days elapsing from the final logging out date and time to the latest logging in date and time of the relevant player is extracted, and the training plan is selected from among them by the player. Then, the training for increasing the parameters the strength 506, the stamina 507 and the judgment 508 is carried out in accordance with the daily training plan selected at this point. Then, on carrying out the training of the breeding character in accordance with the training plan, the parameters the strength 506, the stamina 507 and the judgment 508 of the breeding character are updated.

Also, the game server apparatus 200 of an online game system according to the embodiment manages the position 405 and the orientation 406 of the player character of the player of the video game apparatus 100 which is in the online condition. As the image of the game space is displayed perspective transformed from the first person point of view of the player character in the video game apparatus 100, the range (the visible range) of the game space displayed as an image on the display screen 122 in each video game apparatus 100 is recognized in the game server apparatus 200.

The game server apparatus 200 specifies the objects (the player characters and the breeding characters) in the visible range for each video game apparatus 100, and transmits the visible range information including this as information to each video game apparatus 100 which is in the online condition. By this means, the images of not only the breeding characters which the relevant player is breeding, but also the breeding characters which the other players are breeding are displayed on the display screen 122 in the video game apparatus 100.

As the information on the breeding characters which the other players are breeding is included in the visible range information in this way, each player, while comparing each player's own breeding characters with the breeding characters of the other players, can recognize a degree of growth thereof. Naturally, as the differences between the major aspects of each breeding character, which are the egg, the chick, the young bird and the grown bird, are updated only by the number of breeding days 505, regardless of the details of the breeding which each player has carried out, the player, with no great change in form occurring in the breeding characters of the other players, does not feel any sense of strangeness in the display of the growth of the breeding characters of the other players.

With respect to this, in the event that the parameters the strength 506, the stamina 507 and the judgment 508 differ depending on the details of the breeding which each player has carried out, the difference occurs in the aspects of the ancillary portions, which are the thickness of the legs, the size of the tail feathers and the length of the beak. As the player generally pays attention to even a detailed aspect of the breeding character which he or she is breeding, it is possible to distinguish even this kind of difference in the aspects of the ancillary portions with respect to his or her breeding character.

Even in the event only that the difference is occurring in the aspects of the ancillary portions in this way, the player can also recognize that the parameters of the breeding character have been updated by the breeding details which he or she has carried out from a difference in characteristics of an appearance configuration thereof. Also, even though the differences in the major aspects, which are the egg, the chick, the young bird and the grown bird, change automatically in accordance with the number of breeding days 505, regardless of the details of the breeding which the player has carried out, as the parameters fixing a performance of the breeding character, which are the strength 506, the stamina 507 and the judgment 508, change, resulting in the aspects of the ancillary portions also changing, the player can appreciate that he or she is breeding the breeding character him or herself, and it is possible to maintain an interest in the breeding of the breeding character.

Contrarily, the player does not generally pay as much attention to the breeding characters which the other players are breeding as to the breeding character which he or she is breeding. For this reason, in the event that there is no difference in the major aspects, which are the egg, the chick, the young bird and the grown bird, for the breeding characters of the other players, the player is not particularly concerned about the differences in the aspects of the ancillary portions, which are the thickness of the legs, the size of the tail feathers, and the length of the beak. For this reason, even though a change has occurred in the aspects of the ancillary portions of the breeding characters of the other players, in accordance with the details of the breeding carried out by the other players, the player does not feel much sense of strangeness in the display.

Also, in order for the player to carry out the training of the breeding character, the player has to select in advance the training plan from among the training plan candidates extracted in accordance with the number of days elapsing from the final logging out date and time to the latest logging in date and time of the relevant player. Then, the success or otherwise of the training, which positively or negatively updates the parameters the strength 506, the stamina 507 and the judgment 508 of the breeding character as the whole, is determined by a comparison with the training plan selected in advance. As the details of the training to be carried out for the breeding character are fixed in advance as the training plan in this way, it is possible to further heighten a desire of the player to try to carry out the training of the breeding character.

What is more, as the selection of the training plan is ultimately left up to a judgment of the player, the player actively selects the training plan, so it is possible to further heighten the desire of the player to try to carry out the training of the breeding character. Naturally, as the training plan candidates are extracted in the server apparatus 200, it is not that the player is completely free to select the training plan, so it does not happen that the selected training plan, and furthermore the details of the training carried out in accordance with the training plan, become lopsided.

Herein, in the event that the parameters the strength 506, the stamina 507 and the judgment 508 of the breeding character are updated in accordance with the daily training plan, it is first determined whether the training has succeeded or not. Herein, in the event that the fact that some kind of training has been carried out is recorded, even though it is different from the training plan indicated in the selected breeding plan, or the training plan itself is one with a high degree of difficulty, there is a possibility of it being deemed a success depending on the value of the extracted random number. Meanwhile, although the higher the degree of difficulty of the training, the lower the possibility of it being determined the success, the amount of increase of the parameters when it is the success is larger.

The training which the player has carried out for the breeding character sometimes being the success and sometimes the failure in this way, and also, as a way in which the parameters the strength 506, the stamina 507 and the judgment 508 are updated differs depending on whether the training has succeeded or failed, and furthermore on the details of the selected breeding plan, it is possible to heighten the interest of the player in the breeding of the character.

Also, among the parameters set in the breeding character, the stomach condition 510 and the affection 511 are also increased by the player carrying out the care (the feeding and the caressing) of the breeding character, regardless of the training plan. For this reason, it is possible to heighten the interest of the player in the breeding of the breeding character outside of the selected training plan too. The value of the affection 511 in particular, as it affects the determination of whether the training carried out for the breeding character in accordance with the training plan has succeeded or not, can also heighten the desire of the player to carry out the care of the breeding character outside of the training corresponding to the training plan, and can heighten the interest of the player in the breeding of the breeding character.

Also, each player can carry out both the training and the care of the breeding character only in the online condition. For this reason, as it is necessary for the player to attain the online condition (that is, to attain the condition in which it is possible to participate in the network game) by going through logging in procedures even to just carry out the training and care of the breeding character, it is possible to heighten a desire of the player to try to participate in the network game.

Then, as the training and the care of the breeding character can only be carried out in the online condition, it is possible to centrally manage each parameter set in the breeding character of each player by the server apparatus 200, without managing them in the individual video game apparatuses 100. For this reason, it is possible to prevent each player from illicitly updating the parameters set in his or her breeding character contrary to the training and care conforming to an original flow of the game.

Incidentally, a number of days worth of training plans of the breeding character commensurate with a time from the player logging out until next logging in, that is, the number of days elapsing when the video game apparatus 100 has been in the offline condition, are selected. Then, as the training is carried out for the breeding character in accordance with that number of days worth of training plans, and the parameters the strength 506, the stamina 507 and the judgment 508 are updated by the training, it is possible to make the player appreciate that the breeding character is growing, even in a period in which it has been in the offline condition.

Herein, in order to update the parameters of the breeding character, it not being sufficient simply to carry out the training for the breeding character with the player's own video game apparatus 100, it is necessary for each player to have the player character speak to the breeding character again. As such, when the player character has spoken to the breeding character stored in the breeding information table 600, the daily training details 604 are read one day at a time, and reflected in the parameters thereof in one day units.

The growth of the breeding character in one-day units are transmitted sequentially as the growth event information from the game server apparatus 200 to the video game apparatus 100, and the appearance of the breeding character growing every day is displayed as the image. By this means, the player is able to further appreciate the growth of the breeding character, including the result of the training carried out for the breeding character being reflected in the update of the parameters (in particular, the strength 506, the stamina 507 and the judgment 508), and the interest in the breeding is further heightened.

Furthermore, it is possible to cause the breeding character bred by the instructions according to the training plan selected by the player, or by instructions separate from the training plan, to participate in the race in the game, and compete with the breeding characters which the other players have bred. For this reason, it is possible to further heighten the interest of the player in breeding the breeding character.

The invention not being limited to the heretofore described embodiment, various modifications and applications are possible. Hereafter, a description will be given of modification aspects of the heretofore described embodiment which are applicable to the invention.

Although, in the heretofore described embodiment, the image displayed on the display screen 122 of the video game apparatus 100 is generated perspective transformed from the first person point of view of the player character, not being limited to the image generated perspective transformed from this kind of point of view position, it is also acceptable to set a position of a point of view separate from the position of the player character. In a case in which the point of view and a direction of a visual axis etc. are not unambiguously fixed from the position and the direction of the player character, it is sufficient to further store and manage the position of the point of view, the direction of the visual axis, a width of an angle of view etc. for each player in the game server apparatus 200.

In the heretofore described embodiment, in the event that the final logging out date and time 408 is not registered when the player character speaks to the breeding character, the candidates of the daily training plan are extracted in the game server apparatus 200, and the player selects the desired training plan from among the candidates of the training plan in the video game apparatus 100.

With respect to this, when the player character speaks to the breeding character, it is also acceptable that the control unit 203 of the game server apparatus 200 extracts any one training plan only for each day in accordance with the number of days elapsing from the final logging out date and time 408 to the latest logging in date and time 409, and transmits it to the video game apparatus 100. In this case, it is also acceptable that the daily training plan 603 is registered in the breeding information table 600 at the point at which the training plan is extracted in the game server apparatus 200, and that the game server apparatus 200 which has received the training plan does not return information other than the control information.

Alternatively, in a case in which data on every pattern of training plan are recorded in the recording medium 131, and provided as a portion of the game program, it is acceptable that when the player character has spoken to the breeding character, the control unit 203 of the game server apparatus 200 transmits only the number of days elapsing from the final logging out date and time 408 to the latest logging in date and time 409 to the video game apparatus 100. As such, it is also acceptable that the player selects the received elapsing number of days worth of training plans in the video game apparatus 100, transmits the selected daily training plan to the game server apparatus 200, and causes it to be registered in the breeding information table 600 as the training plan 603.

In the former case, it is possible to further prevent the selected training plan, and furthermore the details of the breeding carried out for the breeding character in accordance with the training plan, from becoming lopsided depending on the player. Meanwhile, in the latter case, as it is possible for the player to select at will the training plan in accordance with the number of days elapsing from the final logging out date and time 408 to the latest logging in date and time 409, on account of which it is possible to freely carry out the training for the breeding character, it is possible to further heighten the desire of the player to try to carry out the breeding of the breeding character.

Also, in either of these case, as the training is carried out for the breeding character in accordance with the number of days worth of training plans commensurate with the time from the player logging out until next logging in, that is, the number of days elapsing when the video game apparatus 100 has been in the offline condition, the parameters the strength 506, the stamina 507, the judgment 508 and the like are updated by the training. For this reason, it is possible to make the player appreciate that the breeding character is growing during the time from the player logging out until next logging in, that is, the number of days elapsing when the video game apparatus 100 has been in the offline condition.

In the heretofore described embodiment, the training plan of the breeding character is selected in accordance with the number of days elapsing from the final logging out date and time 408 to the latest logging in date and time 409. However, it is also acceptable not to select the training plan of the breeding character in accordance with the number of days elapsing when the video game apparatus 100 has been in this kind of offline condition, that is, in accordance with a past happening, but to select a training plan which should be carried out in the future. For example, it is sufficient that the player selects a prescribed number of days worth of training plans from an actual day (a following day) by logging out, subsequently logs in accordance with the selected training plans, and carries out the training of the breeding character.

Herein, it can be taken that, in the event that the player has not logged in on the selected day of the training plan, the training of the relevant day has not been done. Alternatively, it can also be taken that even though the player logs in on a day later than the selected day of the training plan, a plurality of days worth of training is carried out for the breeding character in the play on the day of the logging in. In this case, for example, in a case in which, after selecting three days worth of training, the next logging in has been five days later, it is possible to allot a default training plan, or allot a training plan with the same details as the third day, to the training plans of the fourth and fifth days in the game server apparatus 200.

In the heretofore described embodiment, in the event that the player character speaks to the breeding character after carrying out the training of the breeding character in accordance with the selected training plan, regardless of whether the player is continuing the game after the relevant training without logging out, or has logged in again after once logging out and is playing the game, the parameters the strength 506, the stamina 507 and the judgment 508 are updated in accordance with the training carried out for the breeding character.

With respect to this, with a condition that the player has logged in anew after once logging out, it is also acceptable that the parameters the strength 506, the stamina 507 and the judgment 508 are updated in accordance with the training the player has carried out for the breeding character before the final logging out. In this case, without making it a condition that the player character speaks to the breeding character, it is possible to cause the growth event process to be carried out at a time of the new logging in.

In this case, after the player has carried out the training of the breeding character, the details of the relevant training are reflected as the parameters of the breeding character under the condition that the player logs in again after once logging out, so it is possible to increase a desire of the player to log in again after logging out, and try to participate in the network game.

In this case, as the breeding result during the online time is reflected in the parameters of the breeding character immediately on the player logging in anew from the video game apparatus 100, only a short time is needed until the details of the breeding carried out in the offline condition are reflected in the parameters of the breeding character. Also, even in a kind of case in which the player does nothing for the breeding character from logging in until logging out again, it is possible to reflect the details of the breeding carried out in the preceding offline condition in the parameters of the breeding character.

In the heretofore described embodiment, it being possible to carry out both the training and the care of the breeding character only in the online condition, it is not possible to carry out any implementation of the game at all in the offline condition. With respect to this, it is also acceptable to arrange that the breeding plan of the breeding character is selected (the player selecting at will in the video game apparatus 100, selecting unambiguously in the server apparatus 200, and the player ultimately selecting in the video game apparatus 100 from the selection candidates in the server apparatus 200 are all possible) in the online condition (for example, at a time of logging out or the like), and the player carries out the breeding of the breeding character in the video game apparatus 100 in the offline condition, in accordance with the breeding plan selected when it is in the online condition.

In this case, the breeding plan selected in the same way as the heretofore described case is managed in the server apparatus 200. Also, the selected breeding plan being stored in the video game apparatus 100 too before logging out, the player, in accordance with the stored breeding plan, by giving an instruction from the input unit 161 in the video game apparatus 100 in the offline condition, carries out the training of the breeding character. Then, the details of the breeding carried out are stored in the RAM 105 (they can be saved in the memory card 162).

Subsequently, when the player has logged in and the video game apparatus 100 has attained the offline condition, or a further prescribed event has occurred, it is sufficient to transmit the breeding information indicating the details of the breeding carried out in the offline condition, and stored in the RAM 105, to the server apparatus 200. The server apparatus 200, in accordance with the breeding information, can sequentially determine the success or failure of the breeding plans, and update the parameters the strength 506, the stamina 507 and the judgment 508 registered in the breeding character table 500.

By arranging that the breeding of the breeding character can be carried out in the offline condition in this way, the player, in the event that he or she simply carries out the training of the breeding character, can readily implement the game (in this case, carry out the training of the breeding character) without going through troublesome logging in procedures, including the user authentication.

It is also acceptable that the training of the breeding character can be carried out in either the online condition or the offline condition. In this case, it is also acceptable that training which can be carried out for the breeding character in the online condition, and training which can be carried out for the breeding character in the offline condition, are different.

In the heretofore described embodiment, of the parameters set in the breeding character, the strength 506, the stamina 507 and the judgment 508 are updated in accordance only with the training carried out based on the training plan, while the stomach condition 510 is also increased by the care carried out regardless of the training plan. With respect to this, the affection 511 may be increased by both the training according to the training plan and by the care unconnected with the training plan. With respect to this, it is acceptable both that the parameters updated in accordance with the training carried out based on the training plan, and the parameters updated in accordance with the care carried out regardless of the training plan, are exactly the same or having nothing at all in common.

Although, in the heretofore described embodiment, of the parameters set in the breeding character, the parameters the strength 506, the stamina 507 and the judgment 508 also have an effect on the appearance (the thickness of the legs, the length of the beak, and the size of the tail feathers) as well as fixing the performance of the breeding character, it is also acceptable that the parameters which fix the performance of the breeding character and the parameters which fix the appearance are completely different. It is also acceptable that, among the parameters which fix the performance of the breeding character, there are parameters which fix the appearance and parameters which do not fix the appearance.

In the heretofore described embodiment, the breeding character being the character in the bird form, the major aspects thereof (the distinction between the egg, the chick, the young birds and the grown birds) change in accordance only with the number of breeding days, while the aspects of the ancillary portions (the thickness of the legs, the length of the beak, and the size of the tail feathers), even though the major aspects are the same, differ in accordance with the breeding result. Meanwhile, the color of the breeding character remains unchanged from the start of the breeding. With respect to this, although it is acceptable that the color of the breeding character changes, it is preferable that the color too, in the same way as the major aspects, changes only in accordance with the number of breeding days.

In the heretofore described embodiment, the video game apparatus 100, which is a designated game machine, is applied as a terminal device, connected to the game server apparatus 200 via the network 151, which each player uses for implementing the game. With respect to this, as long as it includes components identical to those of the video game apparatus 100, and has a function which draws an image, it is also acceptable to apply a general purpose personal computer or the like. It is also acceptable to apply a portable game machine (including a portable telephone having an application execution function) which has a configuration wherein the display device 121 and the sound emission device 125 are housed inside a housing identical to that of the apparatus main body 101.

It is possible to apply a semiconductor memory card instead of the DVD-ROM and CD-ROM as the recording medium 131. It is possible to provide a card slot for inserting the memory card instead of the DVD-ROM/CD-ROM drive 113. In the case of the general purpose personal computer, it is acceptable, rather than providing the program and data according to some aspects of the invention stored in the recording medium 131, to provide them stored in advance in the HDD 107. As the recording medium for storing and providing the program and data according to some aspects of the invention, it is possible to apply an optional one appropriate to a physical aspect and a distribution aspect of hardware.

In the heretofore described embodiment, the program and data of the video game apparatus 100 are stored in the recording medium 131 and distributed. With respect to this, it is also acceptable that the program and data are stored in a fixed disc device included in a server device (it can be either the same as or different from the game server apparatus 200) existing on the network 151, and distributed to the apparatus main body 101 via the network 151. In the video game apparatus 100, it is possible that the program and data which the communication interface 115 has received from the server device are saved in the HDD 107, and loaded into the RAM 105 at the time of execution. Furthermore, it is also acceptable that the program and data used in the game server apparatus 200 too are stored in a fixed disc device included in another server device existing on the network 151, and distributed to the apparatus main body 201 via the network 151.

What is claimed is:

1. A network breeding game system, comprising:
a server; and
a plurality of terminals, each being operated by one of a plurality of players and being in one of a connected condition and a disconnected condition with the server via a network, each of the plurality of players using one of the plurality of terminals to breed a character, wherein the server includes:
a character information storage which stores, for the character of each of the plurality of players, major portion parameters indicating an appearance configuration of major portions of the character, non-major portion parameters of the character other than the major portion parameters and indicating an appearance configuration of non-major portions of the character, and a position in which the character exists in a game space;
a visible range information storage which stores, for each of the plurality of players using one of the plurality of terminals which is in the connected condition, visible range information which specifies a range of the game space which is visible in accordance with implementing the game;
a breeding time measurer which measures, for the character of each of the plurality of players, a time elapsing from a start of breeding of the character, the time being measured in days and including a plurality of stages;
a major portion updater which updates, for the character of each of the plurality of players, the major portions of the character through each of the plurality of stages in accordance with only the days measured by the breeding time measurer;
a breeding information receiver which receives breeding information indicating details of breeding carried out in accordance with a breeding instruction given by a breeding operation of one of the plurality of players using one of the plurality of terminals, the breeding information indicating the character of the one of the plurality of players;

a non-major portion updater which updates, for the character indicated by the breeding information received by the breeding information receiver, the non-major portions of the character in accordance with the received breeding information and the plurality of stages, the non-major portions each being present in less than all of the plurality of stages; and a visible object information transmitter which transmits visible object information, including the position and the major portion parameters stored in the character information storage for visible characters included in the range of the game space specified by the visible range information stored in the visible range information storage, to each of the plurality of terminals in the connected condition, the major portions and the non-major portions are physical characteristics of the character, and each terminal of the plurality of terminals includes:

a character breeder which carries out breeding of a corresponding character in accordance with the breeding instruction given by the breeding operation of a corresponding player using the terminal;

a breeding information transmitter which transmits breeding information according to the details of the breeding of the corresponding character carried out by the character breeder to the server;

a visible object information receiver which receives the visible object information transmitted from the visible object information transmitter; and a character displayer which displays, on a display device, the visible characters of which the appearance configuration of major portions corresponds to the major portion parameters included in the received visible object information in accordance with the position of the visible characters included in the visible object information received by the visible object information receiver.

2. The network breeding game system according to claim 1, wherein the character information storage stores, for the character of each of the plurality of players, ancillary portion parameters indicating an appearance configuration of ancillary portions of the character as the non-major portion parameters, the visible object information further includes the ancillary portion parameters stored in the character information storage for the visible characters included in the range of the game space specified by the visible range information, and the character displayer displays the visible characters of which the appearance configuration of ancillary portions corresponds to the ancillary portion parameters of the visible characters included in the visible object information received by the visible object information receiver.

3. The network breeding game system according to claim 1, wherein the character breeder, when a connection between the terminal and the server is severed, carries out the breeding of the corresponding character in accordance with the breeding instruction given by the breeding operation of the corresponding player.

4. The network breeding game system according to claim 3, wherein the character breeder, when the terminal is connected to the server, carries out the breeding of the corresponding character in accordance with the breeding instruction given by the breeding operation of the corresponding player.

5. The network breeding game system according to claim 1, wherein each terminal further includes:

a breeding plan selector which, when connected to the server, selects a breeding plan of the corresponding character in accordance with a breeding plan instruction given by a breeding plan operation of the corresponding player; and a breeding plan transmitter which transmits the breeding plan selected by the breeding plan selector, the character breeder carries out the breeding of the corresponding character in accordance with the breeding instruction given by the breeding operation of the corresponding player based on the breeding plan selected by the breeding plan selector, the server further includes a breeding plan receiver which receives the breeding plan transmitted from the breeding plan transmitter, and the non-major portion updater updates the non-major portions for the character corresponding to the received breeding information, in accordance with the breeding plan received by the breeding plan receiver and the breeding information received by the breeding information receiver.

6. The network breeding game system according to claim 1, wherein the server further includes:

a breeding plan selector which selects a breeding plan for each of the plurality of players to carry out the breeding of the character of each of the plurality of players; and a breeding plan transmitter which transmits the breeding plan selected by the breeding plan selector to the plurality of terminals, each terminal further includes a breeding plan receiver which receives the breeding plan transmitted from the breeding plan transmitter, the character breeder carries out the breeding of the corresponding character in accordance with the breeding instruction given by the breeding operation of the corresponding player based on the breeding plan received by the breeding plan receiver, and the non-major portion updater updates the non-major portions for the character corresponding to the received breeding information, in accordance with the breeding plan selected by the breeding plan selector and the breeding information received by the breeding information receiver.

7. The network breeding game system according to claim 5, wherein the non-major portion updater includes a breeding success determiner which determines, based on the breeding plan selected as the breeding plan of the character and the breeding information received by the breeding information receiver, whether the breeding of the character according to the received breeding plan has succeeded, updates the non-major portions in accordance with a determination result of the breeding success determiner.

8. The network breeding game system according to claim 7, wherein the character breeder includes a non-plan breeder, which carries out breeding for the corresponding character unconnected with the breeding plan, and a plan breeder which carries out breeding for the corresponding character in accordance with the breeding plan, the non-major portions include at least non-plan portions, which are updated in accordance with breeding information corresponding to the breeding carried out unconnected with the breeding plan, and plan portions which are updated in accordance with only breeding information corresponding to the breeding carried out in accordance with the breeding plan, the breeding plan success determiner, being further based on the non-plan portions, determines whether the breeding of the character according to the received breeding plan has succeeded.

9. The network breeding game system according to claim 5, wherein the server further includes a breeding information storage which stores the breeding information received by the breeding information receiver along with the breeding plan corresponding to the received breeding information, and the non-major portion updater, when a prescribed event has occurred during an implementation of a game, updates the non-major portions of the character in accordance with the breeding plan and breeding information stored in the breeding information storage.

10. The network breeding game system according to claim 1, wherein the server further includes:
a character competition causer which causes the character of each of the plurality of players using one of the plurality of terminals in the connected condition to compete in accordance with the non-major portion parameters stored in the parameter storage of the server.

11. A breeding game server apparatus, which is in one of a connected condition and a disconnected condition with each of a plurality of terminals via a network, each of a plurality of players using one of the plurality of terminals to breed a character, the breeding game server apparatus comprising:

a character information storage which stores, for the character of each of the plurality of players, major portion parameters indicating an appearance configuration of major portions of the character, non-major portion parameters of the character other than the major portion parameters and indicating an appearance configuration of non-major portions of the character, and a position in which the character exists in a game space;

a visible range information storage which stores, for each of the plurality of players using one of the plurality of terminals which is in the connected condition, visible range information which specifies a range of the game space which is visible in accordance with implementing the game;

a breeding time measurer which measures, for the character of each of the plurality of players, a time elapsing from a start of breeding of the character, the time being measured in days and including a plurality of stages;

a major portion updater which updates, for the character of each of the plurality of players, the major portions of the character through each of the plurality of stages in accordance with only the days measured by the breeding time measurer;

a breeding information receiver which receives breeding information indicating details of breeding carried out in accordance with a breeding instruction given by a breeding operation of one of the plurality of players using one of the plurality of terminals, the breeding information indicating the character of the one of the plurality of players;

a non-major portion updater which updates, for the character indicated by the breeding information received by the breeding information receiver, the non-major portions of the character in accordance with the breeding information and the plurality of stages, the non-major portions each being present in less than all of the plurality of stages; and a visible object information transmitter which transmits visible object information, including the position and the major portion parameters stored in the character information storage for visible characters included in the range of the game space specified by the visible range information stored in the visible range information storage, to each of the plurality of terminals in the connected condition, wherein the major portions and the non-major portions are physical characteristics of the character.

12. A breeding game terminal apparatus, which is in one of a connected condition and a disconnected condition, via a network, with a server, the server managing, for a character of each of a plurality of players, major portion parameters of the character indicating an appearance configuration of major portions of the character, non-major portion parameters of the character other than the major portion parameters and indicating an appearance configuration of non-major portions of the character, and a position in which the character exists in a game space, the server further managing visible range information which specifies a range of the game space which is visible in accordance with implementing the game, the apparatus comprising:

a character breeder which carries out breeding of a corresponding character in accordance with a breeding instruction given by a breeding operation of a corresponding player using the terminal apparatus;

a breeding information transmitter which transmits breeding information according to details of the breeding of the corresponding character carried out by the character breeder to the server;

a visible object information receiver which receives visible object information, including the position and the major portion parameters of visible characters included in the range of the game space specified by the visible range information managed in the server, from the server; and a character displayer which displays, on a display device, the visible characters of which the appearance configuration of the major portions corresponds to the major portion parameters included in the visible object information in accordance with the position of the visible characters included in the visible object information received by the visible object information receiver, wherein the major portions of the character are updateable through a plurality of stages in accordance with only a time elapsing from a start of the breeding of the character, the time being measured in days and including a plurality of stages, and the major portions and the non-major portions are physical characteristics of the character, with the non-major portions each being present in less than all of the plurality of stages.

13. A character display method executed in a server, which is in one of a connected condition and a disconnected condition with each of a plurality of terminals via a network, each of a plurality of players using one of the plurality of terminals to breed a character, the method comprising:

in the server, storing in a storage, for the character of each of the plurality of players, major portion parameters indicating an appearance configuration of major portions of the character, non-major portion parameters of the character other than the major portion parameters and indicating an appearance configuration of non-major portions of the character, and a position in which the character exists in a game space;

in the server, storing in the storage, for e each of the plurality of players using one of the plurality of terminals which is in the connected condition, visible range information which specifies a range of the game space which is visible in accordance with implementing the game;

in the server, measuring with a time measurer, for the character of each of the plurality of players, a time elapsing from a start of breeding of the character, the time being measured in days and including a plurality of stages;

in the server, updating, for the character of each of the plurality of players, the major portions of the character stored in the storage through each of the plurality of stages in accordance with only the days measured by the time measurer;

in each terminal, carrying out breeding of a corresponding character in accordance with a breeding instruction given by a breeding operation of a corresponding player with a controller of the terminal;

transmitting breeding information, indicating details of the breeding carried out in accordance with the breeding instruction given by the breeding operation of the corresponding player in each terminal, from a terminal side communicator included in each terminal, and causing it to be received by a server side communicator included in the server;

in the server, updating the non-major portions stored in the storage in accordance with the received breeding information for the character indicated by the received breeding information and the plurality of stages, the non-major portions each being present in less than all of the plurality of stages;

transmitting visible object information, including the position and the major portion parameters, stored in the storage, for visible characters included in the range of the game space specified by the visible range information stored in the storage, to each of the plurality of terminals in the connected condition, from the server side communicator, and causing it to be received by the terminal side communicator; and displaying, on a display device, the visible characters of which the appearance configuration of the major portions corresponds to the major portion parameters included in the visible object information in accordance with the position of the visible characters included in the visible object information, in a terminal which has received the visible object information, wherein the major portions and the non-major portions are physical characteristics of the character.

14. A non-transitory computer-readable medium including a program that is executable in a computer, which is in one of a connected condition and a disconnected condition with each of a plurality of terminals via a network, each of a plurality of players using one of the plurality of terminals to breed a character, the program causing the computer to function as:

a character information manager which stores, for the character of each of the plurality of players, major portion parameters indicating an appearance configuration of major portions of the character, non-major portion parameters of the character other than the major portion parameters and indicating an appearance configuration of non-major portions of the character, and a position in which the character exists in a game space, in a storage included in the computer;

a visible range information manager which stores, each of the plurality of players using one of the plurality of terminals which is in the connected condition, visible range information which specifies a range of the game space which is visible in accordance with implementing the game, in a storage included in the computer;

a breeding time measurer which measures, for the character of each of the plurality of players, a time elapsing from a start of breeding of the character, the time being measured in days and including a plurality of stages;

a major portion updater which updates, for the character of each of the plurality of players, the major portions of the character through each of the plurality of stages in accordance with only the days measured by the breeding time measurer;

a breeding information receiver which receives breeding information indicating details of breeding carried out in accordance with a breeding instruction given by a breeding operation of one of the plurality of players using one of the plurality of terminals, the breeding information indicating the character of the one of the plurality of players;

a non-major portion updater which updates, for the character indicated by the breeding information received by the breeding information receiver, the non-major portions of the character in accordance with the received breeding information and the plurality of stages, the non-major portions each being present in less than all of the plurality of stages; and a visible object information transmitter which transmits visible object information, including the position and the major portion parameters managed by the character information manager for visible characters included in the range of the game space specified by the visible range information managed by the visible range information manager, to each of the plurality of terminals in the connected condition, wherein the major portions and the non-major portions are physical characteristics of the character.

15. A non-transitory computer-readable medium including a program that is executable in a computer, which is in one of a connected condition and a disconnected condition, via a network, with a server, the server managing, for a character of each of a plurality of players major portion parameters of the character indicating an appearance configuration of major portions of the character, non-major portion parameters of the character other than the major portion parameters and indicating an appearance configuration of non-major portions of the character, and a position in which the character exists in a game space, the server further managing visible range information which specifies a range of the game space which is visible in accordance with implementing the game, the program causing the computer to function as:

a character breeder which carries out breeding of a corresponding character in accordance with a breeding instruction given by a breeding operation of a corresponding player using the computer;

a breeding information transmitter which transmits breeding information according to details of the breeding of the corresponding character carried out by the character breeder to the server;

a visible object information receiver which receives visible object information, including the position and the major portion parameters of visible characters included in the range of the game space specified by the visible range information managed in the server, from the server; and a character displayer which displays, on a display device, the visible characters of which the appearance configuration of the major portions corresponds to the major portion parameters included in the visible object information in accordance with the position of the visible characters included in the visible object information received by the visible object information receiver, wherein the major portions of the character are updatable through a plurality of stages in accordance with only a time elapsing from a start of the breeding of the character, the time being measured in days and including a plurality of stages, and the major portions and the non-major portions are physical characteristics of the character, with the non-major portions each being present in less than all of the plurality of stages.

16. The network breeding game system according to claim 1, wherein the major portions of the character comprise an egg, a chick, a young, bird, and a grown bird in different ones of the plurality of stages, the non-major portions comprise a thickness of legs, a size of tail feathers, and a length of beak in some of the plurality of stages, and the thickness of legs, the size of tail feathers, and the length of beak are not present in the one of the plurality of stages corresponding to the egg.

17. The breeding game server apparatus according to claim 11, wherein the major portions of the character comprise an egg, a chick, a young, bird, and a grown bird in different ones of the plurality of stages, the non-major portions comprise a thickness of legs, a size of tail feathers, and a length of beak in some of the plurality of stages, and the thickness of legs, the size of tail feathers, and the length of beak are not present in the one of the plurality of stages corresponding to the egg.

18. The breeding game terminal apparatus according to claim 12, wherein the major portions of the character comprise an egg, a chick, a young, bird, and a grown bird in different ones of the plurality of stages, the non-major portions comprise a thickness of legs, a size of tail feathers, and a length of beak in some of the plurality of stages, and the thickness of legs, the size of tail feathers, and the length of beak are not present in the one of the plurality of stages corresponding to the egg.

19. The character display method according to claim 13, wherein the major portions of the character comprise an egg, a chick, a young, bird, and a grown bird in different ones of the plurality of stages, the non-major portions comprise a thickness of legs, a size of tail feathers, and a length of beak in some of the plurality of stages, and the thickness of legs, the size of tail feathers, and the length of beak are not present in the one of the plurality of stages corresponding to the egg.

20. The non-transitory computer-readable medium according to claim 14, wherein the major portions of the character comprise an egg, a chick, a young, bird, and a grown bird in different ones of the plurality of stages, the non-major portions comprise a thickness of legs, a size of tail feathers, and a length of beak in some of the plurality of stages, and the thickness of legs, the size of tail feathers, and the length of beak are not present in the one of the plurality of stages corresponding to the egg.

* * * * *

UNITED STATES PATENT AND TRADEMARK OFFICE
CERTIFICATE OF CORRECTION

PATENT NO.        : 8,708,827 B2                                    Page 1 of 1
APPLICATION NO.   : 11/755405
DATED             : April 29, 2014
INVENTOR(S)       : Y. Fujito It is certified that error appears in the above-identified patent and that said Letters Patent is hereby corrected as shown below:

In the Claims

Column 43, line 25 (claim 16, line 4), please change "a young, bird" to -- a young bird --
Column 43, line 36 (claim 17, line 4), please change "a young, bird" to -- a young bird --
Column 44, line 7 (claim 18, line 4), please change "a young, bird" to -- a young bird --
Column 44, line 18 (claim 19, line 4), please change "a young, bird" to -- a young bird --
Column 44, line 29 (claim 20, line 4), please change "a young, bird" to -- a young bird --

Signed and Sealed this
Thirtieth Day of September, 2014

Michelle K. Lee
*Deputy Director of the United States Patent and Trademark Office*